US012566118B2

(12) United States Patent
Piri et al.

(10) Patent No.: US 12,566,118 B2
(45) Date of Patent: Mar. 3, 2026

(54) APPARATUS AND METHODS FOR FOAM GENERATION AND FOAM EVALUATION

(71) Applicant: UNIVERSITY OF WYOMING, Laramie, WY (US)

(72) Inventors: Mohammad Piri, Laramie, WY (US); Yun Xie, Laramie, WY (US); Keerti Vardhan Sharma, Laramie, WY (US); Van Si Le, Laramie, WY (US); Magda Ibrahim Youssif, Laramie, WY (US); Alvinda Sri Hanamertani, Laramie, WY (US); Omar Elkhatib, Laramie, WY (US); Kaustubh Shriram Rane, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 246 days.

(21) Appl. No.: 18/126,168

(22) Filed: Mar. 24, 2023

(65) Prior Publication Data

US 2023/0304907 A1 Sep. 28, 2023

Related U.S. Application Data

(60) Provisional application No. 63/323,906, filed on Mar. 25, 2022.

(51) Int. Cl.
*G01N 7/10* (2006.01)
*B01F 23/235* (2022.01)
(Continued)

(52) U.S. Cl.
CPC ............. *G01N 7/10* (2013.01); *B01F 23/235* (2022.01); *B05B 7/0037* (2013.01);
(Continued)

(58) Field of Classification Search
None
See application file for complete search history.

(56) References Cited

U.S. PATENT DOCUMENTS 4,589,276 A * 5/1986 Djabbarah .............. E21B 21/14
73/60.11
4,620,983 A 11/1986 Zimmer
(Continued)

FOREIGN PATENT DOCUMENTS

| CN | 101798839 A | * | 8/2010 | |
| CN | 111189978 A | * | 5/2020 | ............. G01N 33/00 |
| WO | 2020191491 A1 | | 10/2020 | |

OTHER PUBLICATIONS

International Search Report and Written Opinion dated Aug. 15, 2023 for Application No. PCT/US23/16227.
(Continued)

*Primary Examiner* — Daniel S Larkin
(74) *Attorney, Agent, or Firm* — Patterson + Sheridan, LLP

(57) ABSTRACT

Embodiments of the present disclosure generally relate to apparatus and methods for foam generation, and to apparatus and methods for evaluation of foam systems. In an embodiment, a method of analyzing foam properties includes delivering a foaming composition and a gas to a housing at a pressure of 500 psi to 6,000 psi and a temperature of 35° C. to 150° C., the housing containing an unconsolidated porous media. The method further includes flowing the foaming composition and the gas through the housing, and forming a foam by an interaction of the foaming composition, the gas, and the unconsolidated porous media. The method further includes directing the foam from the housing to a visualization chamber, the visualization chamber in fluid communication with the housing, and measuring a foam characteristic via the visualiza-
(Continued)

tion chamber. The characteristic may include foam half-life, pressure drop through the unconsolidated media, and/or apparent viscosity of the foam.

11 Claims, 10 Drawing Sheets

(51) Int. Cl.
    *B05B 7/00*        (2006.01)
    *E21B 43/16*     (2006.01)
    *G01N 11/00*    (2006.01)
(52) U.S. Cl.
    CPC ............ *E21B 43/164* (2013.01); *G01N 11/00* (2013.01); *G01N 2011/008* (2013.01)

(56) References Cited

U.S. PATENT DOCUMENTS

| | | | | |
|---|---|---|---|---|
| 4,830,794 | A * | 5/1989 | Edgley | E21B 21/062 261/DIG. 26 |
| 6,561,200 | B1 * | 5/2003 | Fournel | B01F 23/235 134/40 |
| 2003/0217421 | A1 * | 11/2003 | Besel | A47L 11/4086 15/50.1 |
| 2018/0171215 | A1 * | 6/2018 | Ortega Rodríguez | C09K 8/602 |
| 2019/0055824 | A1 * | 2/2019 | Babcock | C09K 8/588 |
| 2020/0139310 | A1 * | 5/2020 | Sattler | B01F 25/45241 |
| 2022/0162497 | A1 * | 5/2022 | Telmadarreie | C09K 8/602 |
| 2022/0290031 | A1 * | 9/2022 | Hahn | C09K 8/94 |

OTHER PUBLICATIONS

International Search Report and Written Opinion dated Jul. 28, 2023 for Application No. PCT/US23/16237.
Memon et al. "Study of blended surfactants to generate stable foam in presence of crude oil for gas mobility control", J Petrol Explor Prod Technol. 2017. 7: pp. 77-85.
Liu et al. "Ultra-Low Interfacial Tension Foam System for Enhanced Oil Recovery", Appl. Sci. 2019. 9, 2155, 13 pages.
Osei-Bonsu et al. "Foam stability in the presence and absence of hydrocarbons: From bubble to bulk-scale", Colloids and Surfaces A: Physicochem. Eng. Aspects 481. 2015. pp. 514-526.
Ammonyx Lmdo, Lauramidopropylamine Oxide, Stepan Product Bulletin, Oct. 2017.
Han et al. "Recent Developments on Surfactants for Enhanced Oil Recovery", Tenside Surf. Det. 2021. 58, 3, pp. 164-176.
Fu, et al. "Rheology and stability of nanoparticle-stabilized CO2 foam under reservoir conditions." Journal of Petroleum Science and Engineering 196 (Jan. 1, 2021 ): 107671.
Pang. "The blocking ability and flowing characteristics of steady foams in porous media." Transport in porous media 85 (Mar. 11, 2010): 299-316.
Sun, et al. "Utilization of surfactant-stabilized foam for enhanced oil recovery by adding nanoparticles." Energy & Fuels 28.4 (Apr. 17, 2014): 2384-2394.
Brazilian Office Action dated Oct. 28, 2025 for Application No. BR112024019780-8.

* cited by examiner

APPARATUS AND METHODS FOR FOAM GENERATION AND FOAM EVALUATION

CROSS-REFERENCES TO RELATED APPLICATIONS

This application claims benefit of and priority to U.S. Provisional Patent Application Ser. No. 63/323,906, filed on Mar. 25, 2022, which is incorporated herein by reference in its entirety.

GOVERNMENT RIGHTS

This invention was made with government support under (DE-FE0031787) awarded by the Department of Energy. The government has certain rights in the invention.

BACKGROUND

Field

Embodiments of the present disclosure generally relate to apparatus and methods for foam generation, and to apparatus and methods for evaluation of foam systems for enhanced oil recovery.

Description of the Related Art

Large-scale enhanced oil recovery (EOR) operations typically rely on lab-scale experimental data to determine appropriate conditions for oil recovery such as surfactant type, surfactant concentration, foam quality (for example, gas fraction), and injection rate. However, conventional apparatus and methods for evaluating foam performance, at lab-scale, have thus far been unable to reproduce reservoir conditions. Conventional static mixing (also known as bulk foam generation) techniques, for example, fail to reproduce the foam generation and collapse modes of real-world propped fractures due to the lack of a pore structure. Furthermore, even those conventional foam generation systems that have attempted to reproduce the pore structure of a propped fracture via consolidated cores have fallen short due to the consolidated nature of the core.

Further still, conventional apparatus and methods have failed to reproduce real-world reservoir conditions when it comes to overall length of the flow path through the porous media, generally being only a few inches in conventional lab-scale apparatus. Conventional EOR lab-scale foam generation techniques have also generally failed to fully reproduce reservoir conditions when it comes to pressure and temperature. Finally, conventional EOR foam surfactant screening apparatus are cumbersome and time consuming, often requiring thorough cleaning between different surfactants. In short, lab-scale EOR foam generation techniques of the prior art have proven to be inaccurate and cumbersome.

There is a need for new and improved apparatus and methods for evaluation of foam systems for EOR are needed.

SUMMARY

Embodiments of the present disclosure generally relate to apparatus and methods for foam generation, and to apparatus and methods for evaluation of foam systems for enhanced oil recovery. Apparatus and methods for foam generation and performance evaluation at high-pressure and high-temperature conditions are provided. The foam is gen-erated in-situ through various mechanisms, such as leave-behind, snap-off and lamella division, which are strictly governed by the surfactant-gas injection strategy and pore shapes and sizes of porous media. The foam collapse process can also be different in porous media. Foam collapse in porous media can result from lamella thinning, which is caused by various mechanisms, including capillary suction, gas diffusion or bubble coalescence, and drainage due to gravity or thermal countereffects.

The apparatus and methods disclosed herein can enable foam generation experiments to be conducted at, for example, ambient to reservoir conditions across a broad range of surfactants, brines, and foam generation gases. Embodiments of the apparatus and methods described herein can be used to simultaneously conduct multiple in-situ foam generation experiments on sandpacks at, for example, ambient to reservoir conditions.

In an embodiment, a method of analyzing foam properties at reservoir conditions is provided. The method includes delivering a foaming composition (for example, a solution of a foaming agent in an aqueous medium) and a gas to a housing at a pressure of about 500 psi to about 6,000 psi and a temperature of about 35° C. to about 150° C., the housing containing an unconsolidated porous media. The method further includes flowing the foaming composition and the gas through the housing, and forming a foam by an inter-action of the foaming composition, the gas, and the uncon-solidated porous media. The method further includes direct-ing the foam from the housing to a visualization chamber, the visualization chamber in fluid communication with the housing. The method further includes measuring one or more foam characteristics via the visualization chamber.

In another embodiment, a method of forming a foam in a system is provided. The method includes introducing a foaming composition and a gas to a housing of the system at a pressure of about 500 psi to about 6,000 psi and a temperature of about 35° C. to about 150° C., wherein: the housing contains an unconsolidated porous media; the sys-tem further includes a visualization chamber, the visualiza-tion chamber in fluid communication with the housing; and the gas comprises a hydrocarbon gas, $CO_2$, $N_2$, or combi-nations thereof. The method further includes forming a foam by an interaction of the foaming composition, the gas, and the unconsolidated porous media.

In another embodiment, an apparatus for characterizing foam properties for enhanced oil recovery is provided. The apparatus includes a housing containing an unconsolidated porous media, and one or more pumps configured to deliver a foaming composition and a gas to the housing at a pressure of about 500 psi to about 6,000 psi. The apparatus further includes one or more temperature control devices configured to heat the foaming composition and the gas at a temperature of about 35° C. to about 115° C. The apparatus further includes a foam visualization chamber in fluid communica-tion with the housing, the foam visualization chamber con-figured to allow visualization of a foam produced in the housing.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

Figure 1A:
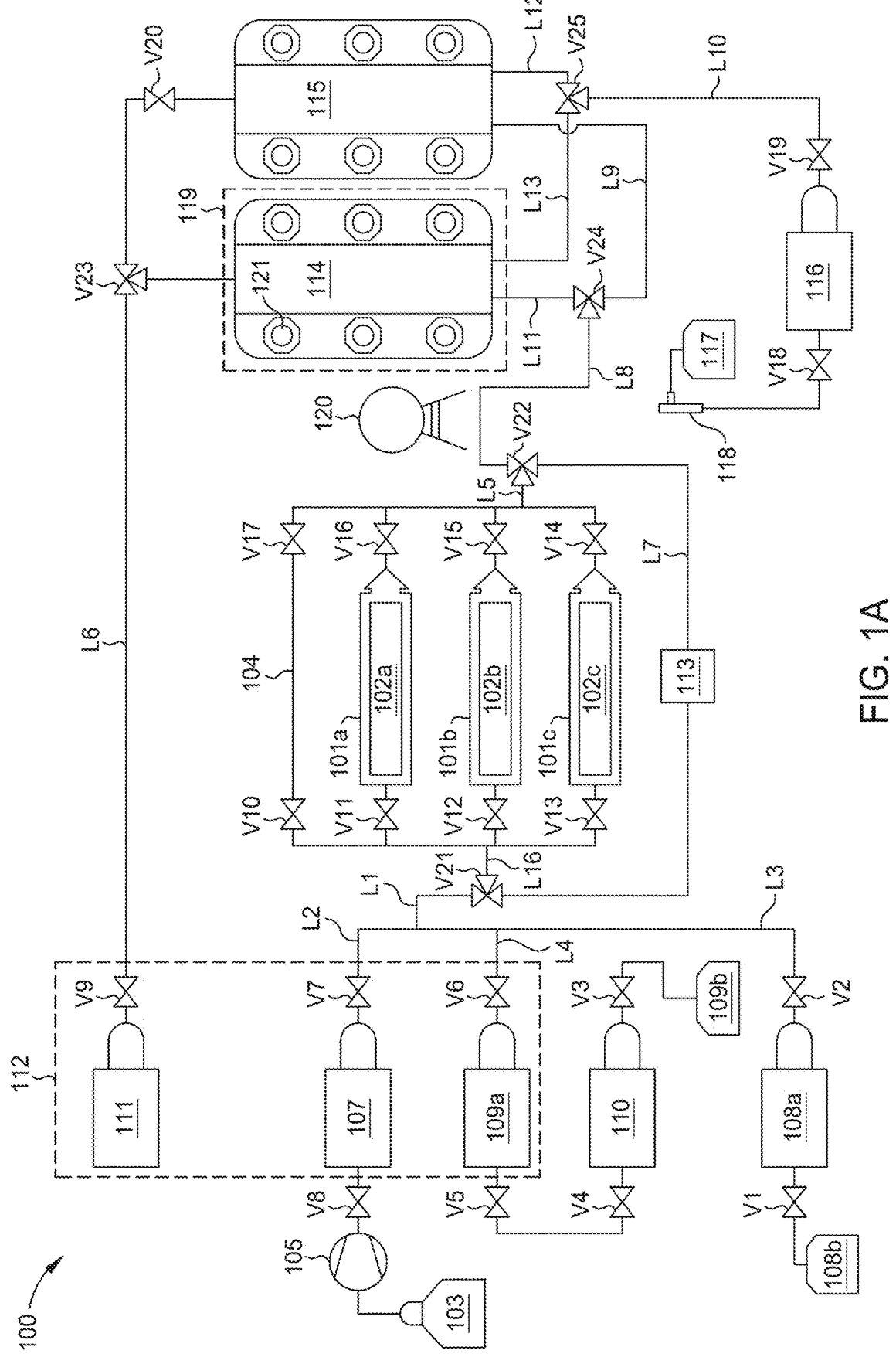
FIG. 1A is a schematic diagram of a module for foam generation and evaluation according to at least one embodiment of the present disclosure.

In the following description, numerous specific details of the devices, device components, and methods of the present disclosure are set forth in order to provide a thorough explanation of the precise nature of the disclosure. It will be apparent, however, to those of skill in the art that the disclosure can be practiced without these specific details.

DETAILED DESCRIPTION

Embodiments of the present disclosure generally relate to apparatus and methods for foam generation, and to apparatus and methods for evaluation of foam systems for enhanced oil recovery. The inventors have found a foam generation system and foam evaluation system that can conduct numerous experiments simultaneously at reservoir conditions. In contrast to conventional foam evaluation apparatus and methods constrained by, e.g., limited capacity and incompatibility with hydrocarbon gases and other gases and reservoir conditions, embodiments of the present disclosure enable, for example, several foam-evaluation tests with varying chemicals and foam parameters at conditions that can mimic real-world applications.

Embodiments of the apparatus and methods described herein enable performing numerous foam generation experiments simultaneously. In some embodiments, up to about eighteen foam generation experiments can be performed simultaneously, though higher or lower numbers of foam generation experiments are contemplated. The inventors also have found apparatus and methods for forming a hydrocarbon gas foam. In fact, embodiments of the apparatus and methods described herein can enable, for the first time, a hydrocarbon gas foam generated in a highly permeable sandpack at, for example, high-pressure and high-temperature conditions. Here, the packing procedure of loose sands in high-pressure compatible tubing described herein is highly reproducible, which can enable reliable measurements. Further, the assembly of high-precision fluid delivery pumps (and/or all hastelloy fluid lines) can enable embodiments described herein to be used with flammable hydrocarbon gases in a highly controlled and safe manner in addition to other gases such as air, $N_2$, $CO_2$, Ar, etc. In additions, the efficient heating and insulation mechanisms can provide better control over the maintenance of temperature. Other advantages and benefits of embodiments of the present disclosure are described herein.

Further, embodiments of the apparatus and methods described herein enable analysis, evaluation, and characterization of the foams generated. Such analysis, evaluation, and characterization can enable analysis of various foam parameters and operating conditions such as gas fraction, injection rate, concentration, operating pressure, salinity, and permeability on foam strength and stability. In contrast to conventional techniques and apparatus, embodiments described herein can enable foam generation and foam evaluation at high temperatures and high pressures. Such high-pressure and high-temperature conditions can be enabled by, for example, the materials utilized for various components. For example, using components made of hastelloy (which can withstand extremely high pressures, up to about 10,000 psi) among other materials, as well as the configuration of the various elements/components can allow for foam generation and foam evaluation at high temperatures and high pressures. Moreover, embodiments described herein can enable foam generation from a variety of gases such as hydrocarbon gases, air, $N_2$, $CO_2$, or Ar, or combinations thereof, among other gases. Hydrocarbon gases can include methane, ethane, propane, butane, isomers thereof, or combinations thereof, among other suitable hydrocarbon gases. Here, elements/components of apparatus described herein are resistant to structural damage and corrosion due to the different types of corrosive gases and fluids.

The integration of the pumps (such as Quizix precision pumps or similar pumps) that are used to inject fluids (such as gases) can deliver fluids for a wide range of flow rates can be employed to maintain high pressures across the porous medium and the apparatus. The heating configurations of the apparatus (and systems) described herein, such as heat enclosures (which can contain thermal insulation) over various components, can be utilized to reduce the heat dissipation.

Embodiments of the apparatus, systems, and methods described herein can enable, for example, simultaneous testing of various foaming agents in different types of porous media and evaluation of their foaming performance and effects of several operating conditions, foam generation parameters. Such implementations are not available using conventional technologies. Further, and relative to conventional technologies, the methods described herein can enable greater control over, for example, the injection parameters, the properties of unconsolidated porous media, and repeatability leading to better experimental accuracies. Embodiments can enable the analysis of different types of porous media and the evaluation of foam performance (which can be real-time) utilizing different operating parameters.

The use of headings is for purposes of convenience only and does not limit the scope of the present disclosure. Embodiments described herein can be combined with other embodiments.

As used herein, a "composition" can include component(s) of the composition, reaction product(s) of two or more components of the composition, a remainder balance of remaining starting component(s), or combinations thereof. Compositions of the present disclosure can be prepared by any suitable mixing process. As used herein, a "formulation" can include component(s) of the formulation, reaction product(s) of two or more components of the formulation, and/or a remaining balance of remaining starting component(s). Formulations of the present disclosure can be prepared by any suitable mixing process.

An apparatus for generating foam and/or characterizing foam properties is provided herein. The apparatus can be utilized for generating foam, and/or analyzing, characterizing, or evaluating foam properties. The apparatus enables generation of foams, and characterization thereof at various conditions. Such conditions can include reservoir conditions, for example, those conditions at a petroleum reservoir. Reservoir conditions can include a pressure from about 500 psi to about 6,000 psi, such as from about 1,000 psi to about 5,500 psi, such as from about 1,500 psi to about 5,000 psi, such as from about 2,000 psi to about 4,500 psi, such as from about 2,500 psi to about 4,000 psi, such as from about 2,500 psi to about 3,000 psi, from about 3,000 psi to about 3,500 psi, or from about 3,500 psi to about 4,000 psi, or about 3,000 psi to about 4,000 psi, or about 3,500 psi. Any of the foregoing numbers can be used singly to describe an open-ended range or in combination to describe a close-ended range. Higher and lower pressures are contemplated. Reservoir conditions can also include a temperature of about 35° C. to about 150° C., such as from about 60° C. to about 140° C., such as from about 75° C. to about 130° C., such as from about 90° C. to about 120° C., such as from about 100° C. to about 110° C. Any of the foregoing numbers can be used singly to describe an open-ended range or in combination to describe a close-ended range. In at least one embodiment, the temperature can be from about 90° C. to about 140° C., such as from about 95° C. to about 135° C., such as from about 100° C. to about 130° C., such as from about 105° C. to about 125° C., such as from about 110° C. to about 120° C.-to about, such as about 115° C. Any of the foregoing numbers can be used singly to describe an open-ended range or in combination to describe a close-ended range. Higher and lower temperatures are contemplated.

In some embodiments, modules (apparatus) described herein (such as apparatus 100 or apparatus 130, described below) can be at least a portion of a system (or at least a portion of a larger apparatus) for foam generation and/or at least a portion of a system (or at least a portion of a larger apparatus) for evaluation, characterization, or analysis of foam systems. Such a system can include a plurality of foam generators distributed over a desired number of modules. In some embodiments, the system includes eighteen foam generators (for example, sandpacks) in total distributed equally over six modules, though higher and lower generators and/or modules are contemplated. Each module can include a fluid-delivering assembly, an array of three foam generators, and an effluent collection assembly. Each module or a particular sandpack can be employed to run foam generation tests autonomously of the other modules. In some embodiments, a system for foam generation and/or foam evaluation, characterization, or analysis can include any number of modules, such as 1, 2, 3, 4, 5, 6, or more modules.

Figure 1B:
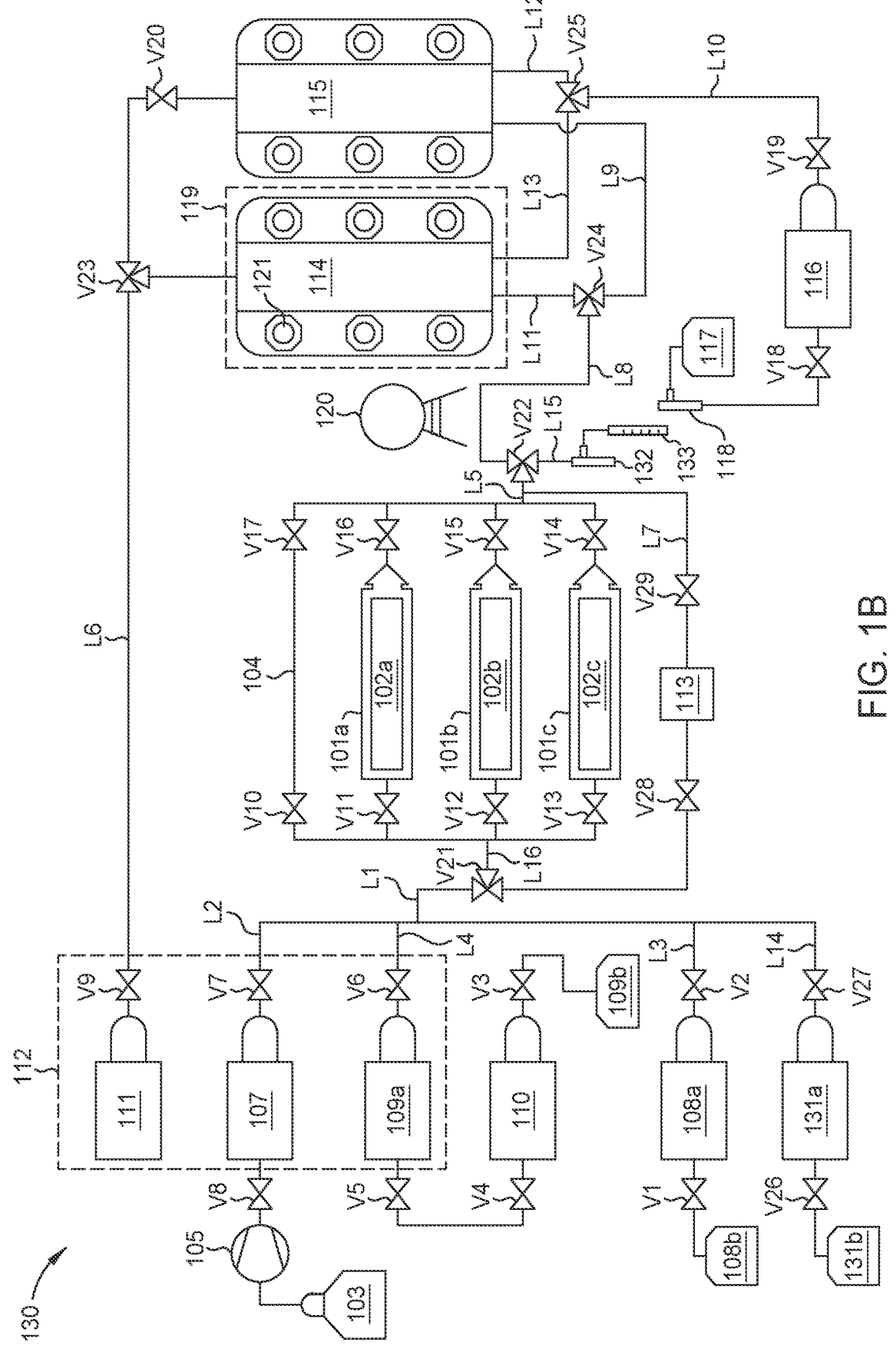
FIG. 1B is a schematic diagram of a module for foam generation and evaluation according to at least one embodiment of the present disclosure.

As a non-limiting example, FIG. 1A shows a schematic diagram of a module (an apparatus 100) for foam generation and evaluation according to at least one embodiment of the present disclosure. In some embodiments, and as described above, the module (the apparatus 100) can be one of a plurality of modules housed in a foam generation and evaluation system, such as one of six modules housed in a foam generation and evaluation system. FIG. 1B shows a schematic diagram of a module (an apparatus 130) for foam generation and evaluation according to at least one embodiment of the present disclosure. In some embodiments, and as described above, the module (the apparatus 130) can be one of a plurality of modules housed in a foam generation and evaluation system, such as one of six modules housed in a foam generation and evaluation system.

The apparatus 100 shown in FIG. 1A and the apparatus 130 shown in FIG. 1B generally includes at least one housing, for example, one or more of housing 101a, housing 101b, or housing 101c, collectively housings 101. The housings 101 (and an unconsolidated porous media) are utilized for foam generation. An unconsolidated porous media is disposed in, located in, housed in, or otherwise contained in the housings 101. As shown, unconsolidated porous media 102a is contained in housing 101a, unconsolidated porous media 102b is contained in housing 101b, and unconsolidated porous media 102c is contained in housing 101c. Each of the unconsolidated porous media 102a-102c can be the same or different such that multiple experiments can be run simultaneously. The terms "housing" and "foam generator" are used interchangeably such that reference to one includes reference to the other.

The housings described herein (for example, housings 101, housings 201) can be of different sizes and contain the unconsolidated porous media and/or natural porous media. The housing is the body/tubing used to house unconsolidated media (e.g., packed loose sands).

When housings 101 are described as being coupled or in fluid communication with one or more elements described herein, it should be understood that the unconsolidated porous media 102 is also coupled or in fluid communication with one or more elements described herein.

As used herein, the term "coupled" refers to a configuration in which elements are directly connected or indirectly connected. The term "in fluid communication" when in reference to elements means that the elements are connected so that a fluid (for example, gas, liquid, foam, vapor, etc.) flowing in one element flows directly or indirectly to the other element.

The apparatus 100 also includes various two-way valves (V1-V20) and three-way valves (V21-V25) positioned between various elements in the apparatus. The two-way valves and three-way valves are positioned to regulate, direct, or control the flow of fluid between elements of the apparatus 100. Valves V11 and V16 enable housing 101*a* (and unconsolidated porous media 102*a*) to be in fluid communication with other elements of the apparatus 100. Valves V12 and V15 enable housing 101*b* (and unconsolidated porous media 102*b*) to be in fluid communication with other elements of the apparatus 100. Valves V13 and V14 enable housing 101*c* (and unconsolidated porous media 102*c*) to be in fluid communication with other elements of the apparatus 100.

The apparatus 100 further includes pumps that are in fluid communication with the housings 101 (and unconsolidated porous media 102) via a line L1. For example, gas pump 107 is in fluid communication with the housings 101 (and unconsolidated porous media 102) and is configured to deliver a gas (for example, hydrocarbon gas (for example, methane), $CO_2$, nitrogen ($N_2$), or combinations thereof) from gas cylinder 103 to the housings 101 (and unconsolidated porous media 102) via lines L2, L1 at various pressures described herein.

One or more pumps in fluid communication with housings 101 are configured to inject or deliver brine and/or surfactant to the housings 101 (and unconsolidated porous media 102) at various pressures described herein. In this example, a brine pump 108*a* is utilized to inject or deliver brine from brine unit 108*b* (which contains brine) to the housings 101 (and unconsolidated porous media 102) via lines L3 and L1, and a surfactant pump 109*a* is utilized to inject or deliver a surfactant (or surfactant solution) from surfactant unit 109*b* (which contains the surfactant or solution thereof) to the housings 101 (and unconsolidated porous media 102) via lines L4, L1. Although the pumps are shown to individually inject or deliver the brine or surfactant, it is contemplated that the foaming composition (for example, a mixture of brine and surfactant) can be injected or delivered by a single pump. In some examples, a pump 110 is utilized to pressurize the foaming composition. Any suitable pumps can be used for injecting or delivering the brine, surfactant, surfactant solution, gas, etc. such as high-precision Quizix 5000 or 6000 series pumps. Two-way valves V1, V2 regulate the flow of brine in the apparatus, two-way valves V3, V4, V5, V6 regulate the flow of surfactant (or surfactant solution) in the apparatus, and two-way valves V7, V8 regulate the flow of gas through the apparatus 100.

One or more gas boosters can be utilized to compress the gas supplied from a cylinder before delivering it to the gas pump. For example, and in the apparatus 100 shown, a gas booster 105 (such as a Haskel gas booster) can be utilized to compress the gas supplied from gas cylinder 103 before delivering it to the gas pump 107. The apparatus 100 also includes a pressure regulation pump 111. The pressure regulation pump 111 is fluidly coupled with a main cell 114 and an effluent cell 115 via line L6 and is utilized to pressurize the cells (for example, the main cell 114 and the effluent cell 115) and to maintain established system pressure. Use of the pressure regulation pump 111 with the main cell 114 and the effluent cell 115 is controlled by operation of two-way valves V9, V20, and three-way valve V23.

The pumps upstream of the housings 101 (and unconsolidated porous media 102), for example, gas pump 107, brine pump 108*a*, surfactant pump 109*a* are in fluid communication with the housings 101 (and unconsolidated porous media 102) via lines L2, L3, and L4, respectively. Introduction of gas, brine, and/or surfactant (or solution of surfactant) with the housings 101 (and unconsolidated porous media 102) can be performed by opening two-way valves V7, V2, and/or V6, respectively. The gas, brine, and/or surfactant (or solution of surfactant) are fed to line L1.

Three-way valve V21 is also opened such that one or more of such fluids can be fed to line L16. In addition, one or more of valves V11, V12, or V13 are opened such that one or more of the fluids (for example, gas, surfactant, brine, oil) can be delivered or injected to housings 101*a*, 101*b*, and 101*c*, respectively and the associated unconsolidated porous media 102.

Apparatus 100 can also include a bypass line 104 to, for example, divert fluid away from housings 101 (and unconsolidated porous media 102). The bypass line 104 can be made operational via use of valves V10, V17.

The apparatus 100 can further include one or more temperature control devices (for example, heaters, heating ovens, heat exchangers, and/or thermal insulators, such as an air bath), as indicated by the dashed boxes. The one or more temperature control devices are utilized to regulate the temperature of various parts (or all) of the apparatus. The temperature can be controlled by, for example, a resistance temperature device and a microprocessor temperature controller. At least one of the temperature control devices can be configured to heat (or regulate the temperature of) various fluids (for example, the surfactant, the foaming composition, and/or the gas, among others). For example, and in the apparatus 100 shown, the gas pump 107, the surfactant pump 109, the pressure regulation pump 111 are positioned inside temperature control device 112 and thus temperature control device 112 can be configured to heat or regulate the temperature of the surfactant, the foaming composition, and/or the gas. Although not shown in FIG. 1A, the housings 101 (and unconsolidated porous media 102) can be positioned in a temperature control device configured to heat or regulate the temperature of the housings.

A differential pressure transducer 113 is positioned along line L7 between the pumps (for example, brine pump 108*a*, surfactant pump 109*a*, and gas pump 107), the cells (for example, main cell 114 and effluent cell 115), and three-way valves V21, V22. The differential pressure transducer 113 serves to monitor or measure the difference in pressure between the pumps and the cells.

Downstream of the housings 101 (and unconsolidated porous media 102), the main cell 114 (for example, a foam visualization chamber) is in fluid communication with housings 101 (and unconsolidated porous media 102) via lines L5, L8, and L11, and three-way valves V22, V24. The main cell 114 (foam visualization chamber) is configured to allow visualization of a foam produced in the housings 101 (and unconsolidated porous media 102). The main cell 114 can include a window 121 (or multiple windows) to enable visualization of the foam, as further described below and in the Examples section. The main cell 114 is also referred to herein as a "visual cell", "foam visualization chamber", or "visualization chamber".

The effluent cell 115 is in fluid communication with the housings 101 (and unconsolidated porous media 102) via lines L5, L8, and L12. Effluent cell 115 is utilized to collect and gradually dump the foam coming from the housings 101 (and unconsolidated porous media 102). For example, when the desired conditions of foam generation (such as steady state condition) is established or when foam stability measurements are desired, the foam is diverted to the main cells/visual cells for the measurement of foam stability (i.e., the foams half life).

The effluent cell 115 and the main cell 114 are in fluid communication by lines L11, L9 and three-way valve V24. The effluent cell 115 and the main cell are also in fluid communication by line L13 and three-way valve V25. An effluent container 117 is in fluid communication with the effluent cell 115 via a relief valve 118 and an effluent pump 116 by use of line L10, three-way valve V25, and two-way valves V18, V19. Here, foam exiting the housings 101 (and unconsolidated porous media 102) via lines L5, L11 can be directed to the effluent cell 115 via line L9. The foam can then be successively retracted by the effluent pump 116 before being delivered via line L13 to the main cell 114 for visual analysis. Relief valve 118 can be used to control the pressure in the apparatus. The effluent pump 116 can be any suitable pump, such as a high-precision Quizix 5000 or 6000 series pump.

The main cell 114 and the effluent cell 115 are positioned inside a temperature control device 119. The temperature control device 119 can be configured to heat (or regulate the temperature of) the main cell 114, as well as various fluids flowing through the main cell 114.

Foam characteristics and foam properties can be observed, monitored, and/or recorded via use of a camera 120 (or camcorder), such as a high-resolution camera or high-resolution camcorder. For example, the camera 120 (or camcorder) can be utilized to record, monitor, and/or observe at least a portion of the foam decay process. The camera 120 (or camcorder), and/or other equipment can be positioned at a location peripheral to the main cell 114 (foam visualization chamber). At such a location, the camera 120 (or camcorder) can observe, monitor, and/or record foam characteristics and foam properties via a window 121. Additionally, or alternatively, other equipment or instruments for evaluating, characterizing, or analyzing the foam can be utilized.

The housings 101 (and an unconsolidated porous media 102) can be arranged in parallel fluid communication with the one or more pumps, such as those described above. For example, the one or more pumps can include: a gas pump configured to deliver a gas to the housing (and the unconsolidated porous media 102); a pump configured to deliver brine, surfactant, and/or a foaming composition to the housing (and the unconsolidated porous media); a pump for pressurizing the foaming composition; an effluent configured to retract effluent and/or deliver effluent to the foam visualization chamber; and/or a pressure regulation pump configured to pressurize the visual cell (also referred to as the main cell or visualization chamber). The housings 101 (or foam generators), and the unconsolidated porous media 102) can be arranged in parallel fluid communication with the one or more pumps and the foam visualization chamber.

FIG. 1B shows a schematic diagram of a module (an apparatus 130) for foam generation and evaluation according to at least one embodiment of the present disclosure. In some embodiments, and as described above, the module (the apparatus 130) can be one of a plurality of modules housed in a foam generation and evaluation system, such as one of six modules housed in a foam generation and evaluation system.

Apparatus 130 shown in FIG. 1B includes many of the same elements described above with respect to apparatus 100 of FIG. 1A. Relative to apparatus 100, the apparatus 130 additionally includes an oil pump 131a, an oil unit 131b containing oil, and a line L14. The oil pump 131a is utilized to deliver or inject oil from oil unit 131b to the housings 101 (and unconsolidated porous media 102) via line L14. Any suitable pump can be used for delivering or injecting the oil, such as high-precision Quizix 5000 or 6000 series pumps.

Apparatus 130 further includes equipment downstream of the housings 101 (and unconsolidated porous media 102). For example, a relief valve 132, in fluid communication with housings 101 via line L15 and three-way valve V22, can be utilized to control pressure in the apparatus. A graduated burette 133 is in fluid communication with the relief valve 132. The graduated burette 133 can be used to collect fluid from the housings 101. Apparatus 130 also includes two-way valves V26, V27, V28, and V29, which are positioned to regulate, direct, or control the flow of fluid between elements of the apparatus 130. The two-way valves V26, V27 regulate the flow of oil in the apparatus 130. The two-way valves V28, V29 isolate the differential pressure transducer 113 from other components of the apparatus 130.

The term "unconsolidated porous media" refers to a porous media comprised of discrete particles, wherein the discrete particles are not attached (for example, sintered, cemented) to each other. Under appropriate conditions (for example, unconstrained, dry, and at atmospheric pressure), an unconsolidated porous media may be flowable. In some embodiments, unconsolidated porous media may include one or more types of sand. The one or more types of sand may have different mineral compositions, shapes, and/or sizes. For example, the sand may be a blend or mixture of sand and/or sand particles having different shapes and/or sizes. In some embodiments, an unconsolidated media may include a proppant for use in an unconventional oil well. The unconsolidated porous media can be hydrophobic, hydrophilic, or can contain both hydrophobic and hydrophilic particles. The unconsolidated porous media can be a sand-pack. Additional and alternative embodiments of the unconsolidated porous media are described herein.

In some examples, the unconsolidated porous media (for example, unconsolidated porous media 102a, 102b, 102c) in the housing 101 (foam generator) has a depth along a flow axis of about 1 inch to about 40 inches, such as from about 5 inches to about 35 inches, such as from about 10 inches to about 30 inches, such as from about 15 inches to about 25 inches, such as from about 15 inches to about 20 inches or from about 20 inches to about 25 inches. The flow axis is the axial direction along the length of the housing 101. The flow of gas from gas cylinder 103 and the flow of the foaming composition are in the same direction.

In some embodiments, a hydrocarbon oil is disposed in the housings 101 (and unconsolidated porous media 102). In at least one embodiment, a hydrocarbon oil is disposed in the unconsolidated porous media that is packed in the housings 101. Other dispositions of the hydrocarbon oil are contemplated. The hydrocarbon oil can be delivered from oil unit 131b to the housings 101 (and unconsolidated porous media 102) via oil pump 131a and lines L14, L1.

Other components, as well as details of these and other components, such as cameras, temperature control devices (for example, heaters, heating ovens, heat exchangers, thermal insulators), gas boosters (and/or gas pumps, mass flow controllers), among others, are described herein with respect to FIG. 1A (and/or FIG. 1B) and in the Examples section.

Figure 2A:
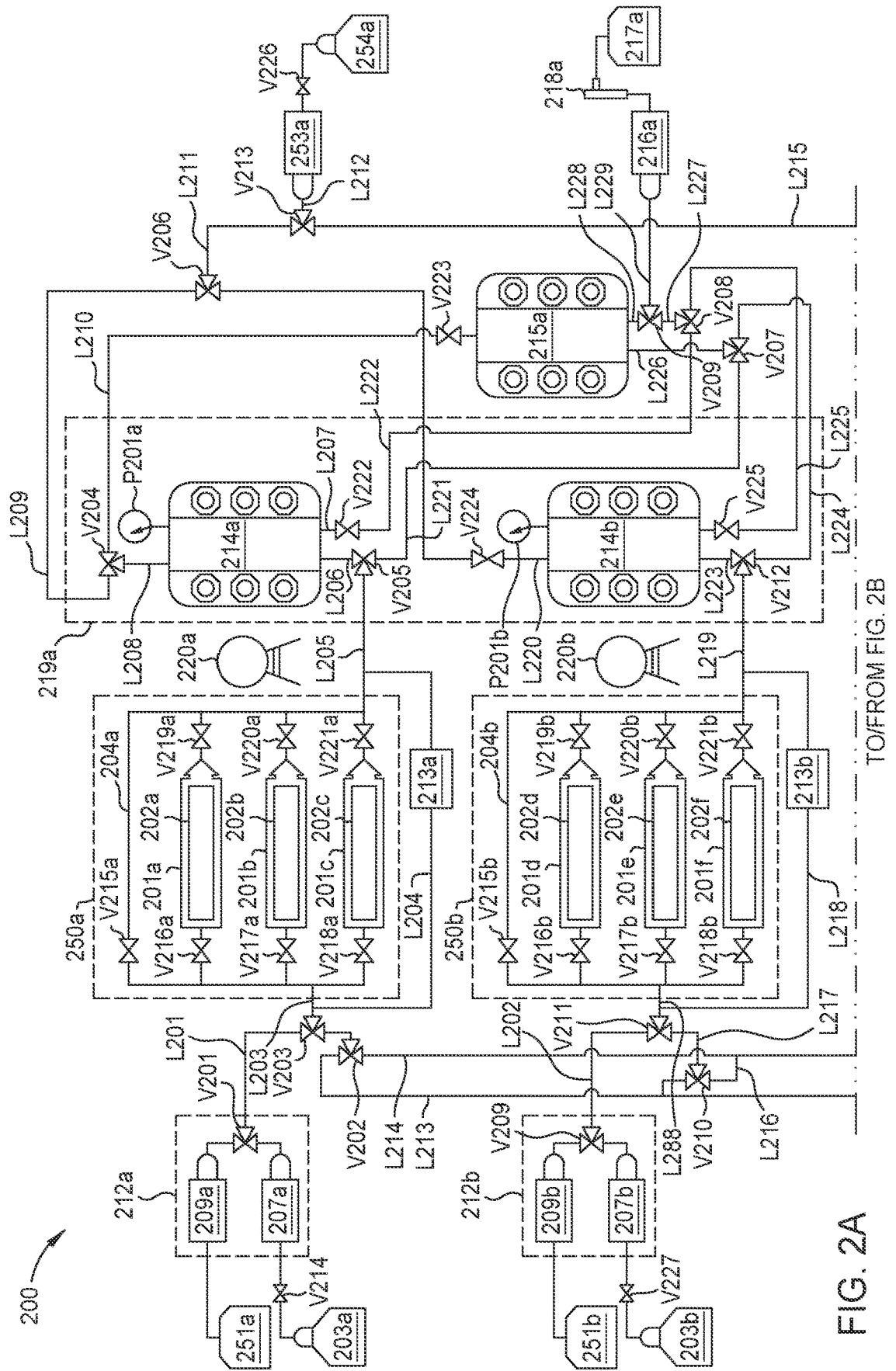
FIGS. 2A-2C show a schematic diagram of an in-situ foam generation and evaluation system according to at least one embodiment of the present disclosure.
Figure 2B:
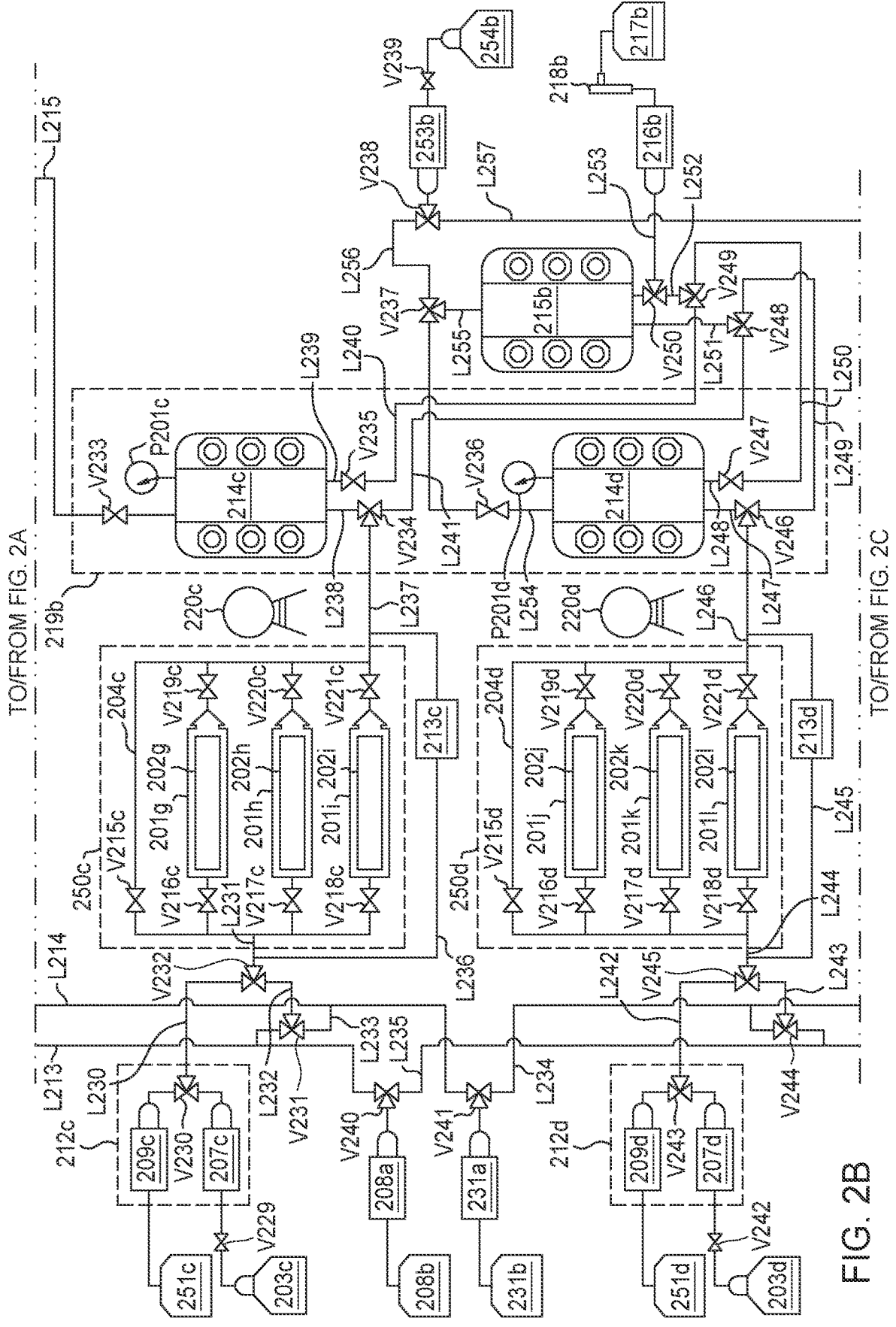
Figure 2C:
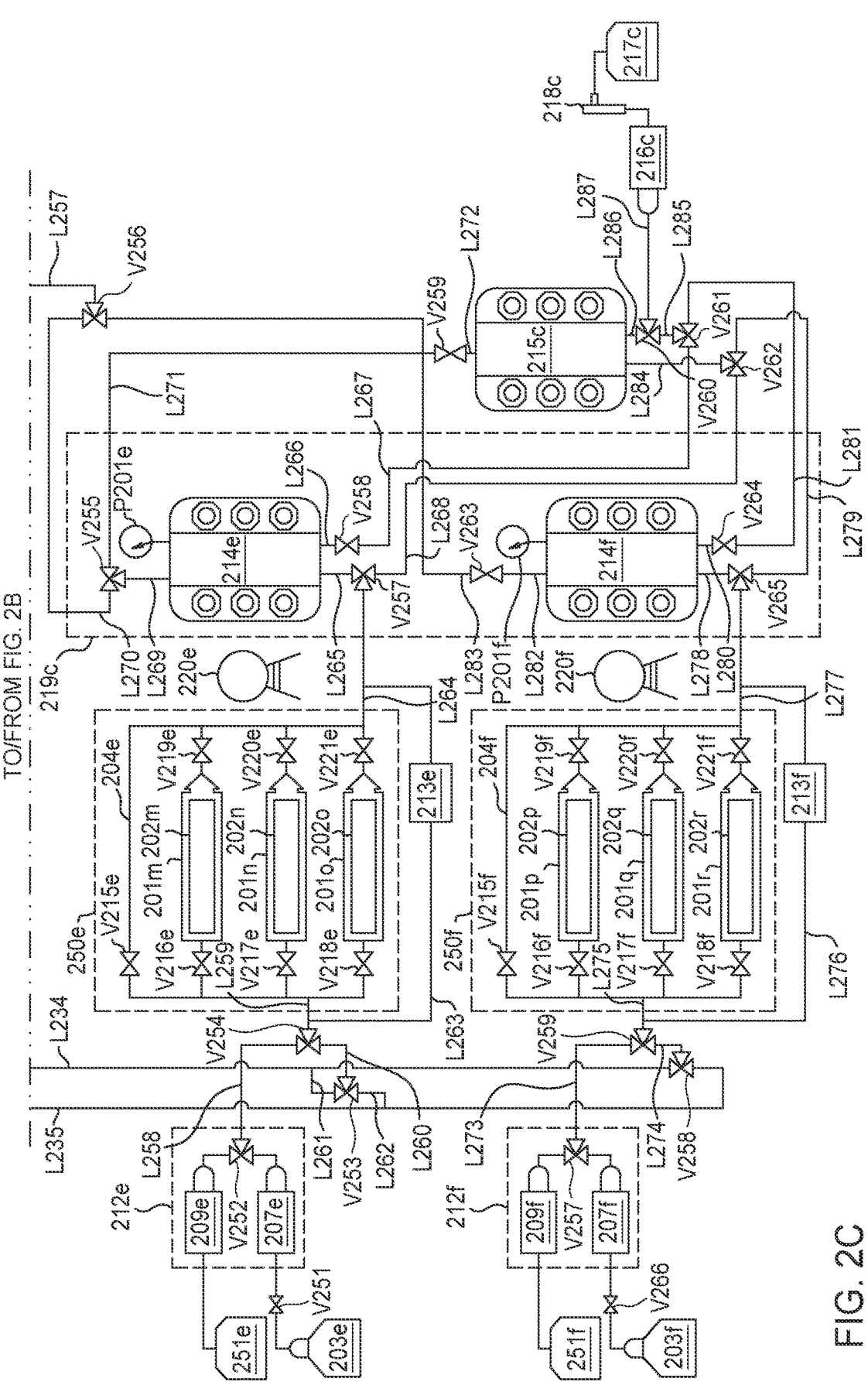

As described above, the apparatus shown in FIG. 1A (apparatus 100) and/or FIG. 1B (apparatus 130) can be at least a portion of a system (or larger apparatus) for in-situ foam generation and/or a system for evaluation, characterization, or analysis of foam systems. A non-limiting embodiment of such a system (or larger apparatus) is shown in FIGS. 2A-2C. Collectively, FIGS. 2A-2C show a system 200 (or apparatus) for in-situ foam generation and/or a system for evaluation, characterization, or analysis of foam systems.

This system or larger apparatus shown in FIGS. 2A-2C can include a plurality of housings (or foam generators). An unconsolidated porous media can be disposed in, located in, housed in, or otherwise contained in each of the plurality of housings. As further described below with respect to system 200, each of the plurality of housings (and the unconsolidated porous media) can be arranged in parallel fluid communication with one or more pumps, such as those described above. For example, the one or more pumps can include: a gas pump configured to deliver a gas to the housing (and the unconsolidated porous media); a pump configured to deliver brine, surfactant, and/or a foaming composition to the housing (and the unconsolidated porous media); a pump for pressurizing the foaming composition; an effluent configured to retract effluent and/or deliver effluent to the foam visualization chamber; and/or a pressure regulation pump configured to pressurize the visual cell (also referred to as the main cell or visualization chamber). The housings (or foam generators) can be arranged in parallel fluid communication with the one or more pumps and the foam visualization chamber. The system 200 can enable for multiple experiments to be conducted simultaneously, such as testing, for example, pressures, temperatures, various surfactants, among other parameters.

The system 200 generally includes housings 201a-201r, collectively housings 201. The housings 201 are utilized for foam generation. The housings can be arranged in parallel. Unconsolidated porous media 202a-202r (collectively, unconsolidated porous media 202) is disposed in, located in, housed in, or otherwise contained in the housings 201. As shown, unconsolidated porous media 202a is contained in housing 201a, unconsolidated porous media 202b is contained in housing 201b, and unconsolidated porous media 202c is contained in housing 201c, and so forth. Each of the unconsolidated porous media 202a-202r can be the same or different such that multiple experiments can be run simultaneously.

When housings 201 are described as being coupled or in fluid communication with one or more elements described herein, it should be understood that unconsolidated porous media 202 is also coupled or in fluid communication with one or more elements described herein.

The system 200 also includes various two-way valves and three-way valves positioned between various elements in the system 200. The two-way valves and three-way valves are positioned to regulate, direct, or control the flow of fluid between elements of the system 200. Two-way valves V216a-V221f enable housings 201 (and unconsolidated porous media 202) to be in fluid communication with other elements of the system 200. For example, two-way valve V216a and two-way valve V219a enables housing 201a (and unconsolidated porous media 202a) to be in fluid communication with other elements of the system 200, while two-way valve V218f and two-way valve V221f enables housing 201r (and unconsolidated porous media 202r) to be in fluid communication with other elements of the system 200.

The system further includes gas pumps 207a-207f (collectively, gas pumps 207) that are in fluid communication with the housings 201 (and unconsolidated porous media 202) via at least one of lines L201, L202, L230, L242, L258, or L273. For example, gas pumps 207a-207f are in fluid communication with the housings 201 (and unconsolidated porous media 202) and are configured to deliver a gas (for example, hydrocarbon gas (for example, methane), $CO_2$, $N_2$, or combinations thereof) from gas cylinders 203a-203f (collectively, gas cylinders 203) to the housings 201 (and unconsolidated porous media 202) at various pressures described herein. The flow of gas from gas cylinders 203 can be controlled by, for example, at least one of two-way valves V214, V227, V229, V242, V251, or V266. The gas (or gas mixture) in each of the gas cylinders 203 can be the same or different such that that multiple experiments can be run simultaneously.

One or more pumps in fluid communication with housings 201 (and unconsolidated porous media 202) are configured to inject or deliver brine and/or surfactant to the housings 201 (and unconsolidated porous media 202) at various pressures described herein. In this example, a brine pump 208a is utilized to inject or deliver brine from a brine unit 208b (which contains brine) to the housings 201 (and unconsolidated porous media 202) via line L213 and/or L235. Three-way valve V240 can be used to control the flow of brine in the system 200.

Surfactant pumps 209a-209f (collectively, surfactant pumps 209) are utilized to inject or deliver a surfactant (or surfactant solution) from surfactant units 251a-251f (collectively, surfactant units 251) which contains the surfactant or solution thereof) to the housings 201 (and unconsolidated porous media 202) via at least one of lines L201, L202, L230, L242, L258, L273. One or more of surfactants (or surfactant solutions) in surfactant units 251 can be the same or different.

The flow of surfactant or solution thereof can be controlled by, for example, at least one of three-way valves V201, V209, V230, V243, V252, or V257. The system 200 further includes oil pump 231a in fluid communication with housings 201 (and unconsolidated porous media 202). In this example, oil pump 231a is utilized to inject or deliver oil from oil unit 231b (which contains oil) to the housings 201 (and unconsolidated porous media 202) via line L214 and/or L234. Three-way valve V241 can be used to control the flow of oil in the system 200.

Although the pumps are shown to individually to inject or deliver the brine or surfactant, it is contemplated that the foaming composition (for example, a mixture of brine and surfactant) can be injected or delivered by a single pump. For example, brine can exit the brine pump 208a and enter line L213 via three-way valve V240, while surfactant (or surfactant solution) can exit the surfactant pump 209a and enter line L201 via three-way valve V210. Opening of three-way valves V202 and V203 can then enable surfactant and brine to mix and form a foaming composition in line L203. Opening of one or more of two-way valves V215a-V218a can then allow the foaming composition to enter one or more of housings 201a-201c (and the associated unconsolidated porous media 202a-202c. In a similar manner, foaming compositions can be made with surfactants (or surfactant solutions) exiting surfactant pumps 209b-209f and fed to one or more housings 201 (and the associated unconsolidated porous media 202).

Any suitable pumps can be used for injecting or delivering the brine, surfactant, surfactant solution, gas, oil, etc. such as high-precision Quizix 5000 or 6000 series pumps.

Although not shown, one or more gas boosters can be utilized to compress the gas supplied from a gas cylinder before delivering it to the gas pump. For example, a gas booster (such as a Haskel gas booster) can be utilized to compress the gas supplied from gas cylinders 203 before delivering it to the gas pumps 207, in a similar manner as gas booster 105 in FIG. 1A. Although not shown, the system 200 can also include a pressure regulation pump. The pressure regulation pump can be fluidly coupled with a main cell and an effluent cell. For example, the pressure regulation pump can be coupled to one or more of main cells 214a-214f (collectively, main cells 214) and/or one or more effluent cells 215a-215c (collectively, effluent cells 215) in order to, for example, pressure the cells and/or maintain established system pressure in a similar manner as the pressure regulation pump 111 in FIG. 1A. Use of the pressure regulation pump can be controlled by operation of two-way valves, three-way valves or both in a similar manner as described for apparatus 100.

The pumps upstream of the housings 201 (and unconsolidated porous media 102), for example, gas pumps 207, brine pump 208*a*, surfactant pumps 209, and oil pump 231*a* are in fluid communication with the housings 201 (and unconsolidated porous media 202) via lines L201, L202, L230, L242, L258, or L273. Introduction of gas, brine, surfactant (or solution of surfactant), and/or oil to the housings 201 (and unconsolidated porous media 202) can be accomplished by opening one or more of three-way valves V203, V211, V232, V245, V254, and V259. The gas, brine, surfactant (or solution of surfactant), and/or oil can be fed to one or more of housings 201 (and the associated unconsolidated porous media 202) via one or more of lines L203, L288, L231, L244, L259, or L275. In addition, one or more of the associated two-way valves V216*a*-V218*f* are opened such that one or more of the fluids (for example, gas, surfactant, brine, oil) can be delivered or injected to one or more of housings 201, respectively, and the associated unconsolidated porous media 202.

The system 200 can also include one or more bypass lines 204*a*-204*f* (collectively, bypass lines 204) to, for example, divert fluid away from housings 101 (and unconsolidated porous media 102). One or more of bypass lines 204 can be made operational via use of one or more of two-way valves V215*a*-V215*f.*

As shown in FIG. 2A-2C, surfactants (or solutions thereof) are delivered to the housings 201 (and unconsolidated porous media 202) from surfactant units 251. One or more of such surfactants (or surfactant solutions) can be the same or different, enabling multiple experiments to be performed simultaneously. Further, via use of various valves and lines in the system 200, the same surfactant (or surfactant solution) of surfactant units 251 and/or the same gas (or gas mixtures) of gas cylinders 203 can go to various unconsolidated porous media 202. For example, surfactant (or solution thereof) from surfactant unit 251*a* and/or gas (or gas mixture) from gas cylinder 203*a* can exit three-way valve V201 via line L201 and be fed to one or more of housings 201*d*-201*f* (and the associated unconsolidated porous media 202*d*-202*f*) via one or more of lines L214, L216, L217, or L288 and operation of three way-valves V202, V203, V210, or V211. Similarly, surfactant (or solution thereof) from surfactant unit 251*a* and/or gas (or gas mixture) from gas cylinder 203*a* can exit three-way valve V201 via line L201 and be fed to one or more of housings 201*g*-201*r* (and the associated unconsolidated porous media 202*g*-202*r*) via one or more of lines L213, L214, L231, L232, L233, L234, L235, L243, L244, L259, L260, L261, L262, L274, or L275, and operation of three way-valves V202, V203, V210, V231, V232, V240, V241, V244, V245, V253, V254, V258, or V259. In a similar manner, surfactant (or solution thereof) from other surfactant units 251 and/or gas (or gas mixture) from other gas cylinders 203 can be fed to various unconsolidated porous media 202.

The system 200 can further include one or more temperature control devices (for example, heaters, heating ovens, heat exchangers, and/or thermal insulators, such as an air bath), as indicated by the dashed boxes. The one or more temperature control devices are utilized to regulate the temperature of various portions of (or all) the system 200. The temperature can be controlled by, for example, a resistance temperature device and a microprocessor temperature controller. Temperature control devices 212*a*-212*f* (collectively, temperature control devices 212) can be configured to heat (or regulate the temperature of) surfactant (or solution thereof) exiting the surfactant pumps 209 and a gas (or mixture of gases) exiting the gas pumps 207. For example, the gas pump 207*a* and the surfactant pump 209*a* are positioned inside temperature control device 212*a* and thus temperature control device 212*a* can be configured to heat or regulate the temperature of the surfactant and/or the gas. Temperature control devices 212 can be set to the same or different operating temperatures such that multiple experiments can be run simultaneously.

Temperature control devices 250*a*-250*f* (collectively, temperature control devices 250) can be configured to heat or regulate the temperature of the housings 201 (and associated unconsolidated porous media 202, and associated fluids fed to the unconsolidated porous media 202). For example, the housings 201*m*-201*o* (and associated unconsolidated porous media 202*m*-202*o*) are positioned inside temperature control device 250*e* and thus temperature control device 250*e* can be configured to heat or regulate the temperature of the housings 201*m*-201*o* (and associated unconsolidated porous media 202*m*-202*o*, and associated fluids fed to the unconsolidated porous media 202*m*-202*o*). Temperature control devices 250 can be set to the same or different operating temperatures such that multiple experiments can be run simultaneously.

Temperature control devices 219*a*-219*c* (collectively, temperature control devices 219) can be configured to heat or regulate the temperature of one or more of main cells 214*a*-214*f*, as well as various fluids flowing through the main cells 214*a*-214*f*. Temperature control devices 219 can be set to the same or different operating temperatures such that multiple experiments can be run simultaneously.

Differential pressure transducers 213*a*-213*f* (collectively, differential pressure transducers 213) are disposed along lines L204, L218, L236, L245, L263, and L276, and positioned between the upstream pumps (for example, brine pump 208*a*, surfactant pumps 209, gas pumps 207, and oil pump 231*a*) and the downstream cells (for example, and effluent). The differential pressure transducers 213 serve to monitor or measure the difference in pressure between the upstream pumps and the downstream cells.

Downstream of the housings 201 (and unconsolidated porous media 202), the main cells 214*a*-214*f* (for example, foam visualization chambers) are in fluid communication with housings 201 (and unconsolidated porous media 202) via one or more of lines L205, L219, L237, L246, L264, and L277. The main cells 214*a*-214*f* (collectively, main cells 214) are configured to allow visualization of foam produced in the housings 201 (and unconsolidated porous media 202). The main cells 214 can include a window (or multiple windows) to enable visualization of the foam, in a similar manner as window 121, further described below and in the Examples section. The main cells 214 are also referred to herein as a "visual cell", "foam visualization chamber", or "visualization chamber". Pressure gauges P201*a*-P201*f* (collectively, pressure gauges P201) are coupled to main cells 214*a*-214*f*, respectively. The pressure gauges P201 are utilized to, for example, monitor pressure in the main cells 214 and ensure the movement of fluids in the system 200. Pressure gauges can also be coupled with effluent cells 215, if desired.

Operation of two-way valves V219*a*-V221*f* allows a fluid (for example, a foam) to exit the housings 201 (and the associated unconsolidated porous media) and travel via one or more of lines L205, L219, L237, L246, L264, and L277.

In addition, operation of one or more of three-way valves V205, V212, V234, V246, V257, and V265 allows the fluids to be fed to the main cells 214. Here, the fluid can be fed to the main cells 214 by one or more of lines L206, L223, L238, L247, L265, and L278.

For example, two-way valve V219a can be opened to allow fluid to flow out of housing 201a (and unconsolidated porous media 202a) and enter line L205, and three-way valve V205 can be opened to allow fluid to flow through line L206 and into the main cell 214a.

The housings 201 (and unconsolidated porous media 202) are in fluid communication with effluent cells 215a-215c (collectively, effluent cells 215) via one or more of lines L221, L224, L241, L249, L268, and L279, among other lines. Effluent cells 215 are utilized to collect and gradually dump the foam coming from the housings 201 (and unconsolidated porous media 202). For example, when the desired conditions of foam generation (such as steady state condition) is established or when foam stability measurements are desired, the foam is diverted to the main cells/visual cells for the measurement of foam stability (i.e., the foam's half life).

Operation of two-way valves V219a-V221f allows a fluid (for example, a foam) to exit the housings 201 (and the associated unconsolidated porous media) and travel via one or more of lines L205, L219, L237, L246, L264, and L277. Operation of one or more of three-way valves V205, V212, V234, V246, V257, and V265 allows the fluids to be fed into one or more of lines L221, L224, L241, L249, L268, and L279. Operation of three-way valves V207, V248, and V262 allows the fluid to flow through lines L226, L251, and L284 and into the effluent cells 215.

For example, two-way valve V219a can be opened to allow fluid to flow out of housing 201a (and unconsolidated porous media 202a) and enter line L205, and three-way valves V205 and V207 can be opened to allow fluid to flow through lines L221 and L226 and into the effluent cell 215a.

One or more of the main cells 214 and one or more of the effluent cells 215 are coupled. As shown in FIG. 2A, main cell 214a is coupled to effluent cell 215a via line L208, three-way valve V204, line L210, and two-way valve V223. Main cell 214a is also coupled to effluent cell 215a via line L207, two-way valve V222, line L222, three-way valve V208, line L227, three-way valve V209, and line L228. Main cell 214a is also coupled to effluent cell 215a via line L206, three-way valve V205, line L221, three-way valve V207, and line L226.

As further shown in FIG. 2A, main cell 214b is coupled to effluent cell 215a via two-way valve V225, line L225, three-way valve V208, line L227, three-way valve V209, and line L228. Main cell 214b is also coupled to effluent cell 215a via line L223, three-way valve V212, line L224, three-way valve V207, and line L226.

As shown in FIG. 2B, main cell 214c is coupled to effluent cell 215b via line L239, two-way valve V235, line L240, three-way valve V249, line L252, and three-way valve V250. Main cell 214c is also coupled to effluent cell 215b via line L238, three-way valve V234, line L241, three-way valve V248, and line L251.

As further shown in FIG. 2B, main cell 214d is coupled to effluent cell 215b via line L248, two-way valve V247, line L250, three-way valve V249, line L252, and three-way valve V250. Main cell 214d is also coupled to effluent cell 215b via line L247, three-way valve V246, line L249, three-way valve V248, and line L251. Main cell 214d is also coupled to effluent cell 215b via line L254, two-way valve V236, three-way valve V237, and line L255.

As shown in FIG. 2C, main cell 214e is coupled to effluent cell 215c via line L266, two-way valve V258, line L267, three-way valve V261, line L285, three-way valve V260, and line L286. Main cell 214e is also coupled to effluent cell 215c via line L265, three-way valve V257, line L268, three-way valve V262, and line L284. Main cell 214e is also coupled to effluent cell 215c via line L269, three-way valve V255, line L271, two-way valve V259, and line L272.

As further shown in FIG. 2C, main cell 214f can be coupled to effluent cell 215c via line L280, two-way valve V264, line L281, three-way valve V261, line L285, three-way valve V260, and line L286. Main cell 214f is also coupled to effluent cell 215c via line L278, three-way valve V265, line L279, three-way valve V262, and line L284. Main cell 214f is also coupled to effluent cell 215c via line L282, two-way valve V263, line L283, three-way valve V256, line L270, three-way valve V255, line L271, two-way valve V259, and line L272.

One or more of the main cells 214 can be coupled to one another. As shown in FIG. 2A, main cell 214a is coupled to main cell 214b via line L208, three-way valve V204, line L209, three-way valve V206, two-way valve V224, and line L220. Main cell 214a can also be coupled to main cell 214b via lines L206 and L223, with associated lines and valves therebetween. Main cell 214a is also coupled to main cell 214b via line L207, two-way valve V222, line L222, three-way valve V208, and two-way valve V225 (with the associated lines). Main cell 214a is coupled to main cell 214c via line L208, three-way valve V204, line L209, three-way valve V206, line L211, three-way valve V213, line L215, and two-way valve V233.

Coupling of main cell 214c and main cell 214d can be similar to that for main cells 214a, 214b, with the appropriate valves and lines. Main cell 214d can be coupled to main cell 214e via line L254, two-way valve V236, three-way valve V237, line L256, three-way valve V238, line L257, three-way valve V256, line L270, three-way valve V255, and line L269. Main cell 214d can be coupled to main cell 214f via line L254, two-way valve V236, three-way valve V237, line L256, three-way valve V238, line L257, three-way valve V256, line L283, two-way valve V263, and line L282. Coupling of main cell 214e and main cell 214f can be similar to that for main cells 214a, 214b, with the appropriate valves and lines.

The system 200 further includes a back-pressure regulation pump 253a and a back-pressure regulation pump 253b (collectively, back-pressure regulation pumps 253). The back-pressure regulation pump 253a is utilized to control the pressure of fluids associated with housings 201a-201i (and associated unconsolidated porous media 202a-202i). The back-pressure regulation pump 253a is utilized to control the pressure of fluids fed through, for example, housings 201a-201i (and associated unconsolidated porous media 202a-202i). The back-pressure regulation pump 253b is utilized to control the pressure of fluids fed through, for example, housings 201j-201r (and associated unconsolidated porous media 202j-202r). Back-pressure regulation pump 253a is coupled to other elements of the system 200 via line L212 and three-way valve V213, and back-pressure regulation pump 253b is coupled to other elements of the system 200 via three-way valve V238 and associated lines.

Each of the back-pressure regulation pumps 253 are coupled to gas cylinders that contain a gas (for example, hydrocarbon gas (for example, methane), $CO_2$, $N_2$, or combinations thereof). For example, back-pressure regulation pump 253a is coupled with gas cylinder 254a via a two-way valve V226, and back-pressure regulation pump 253*b* is coupled with gas cylinder 254*b* via a two-way valve V239.

The system 200 further includes effluent containers 217*a*-217*c* (collectively, effluent containers 217) in fluid communication with effluent cells 215*a*-215*c*, via relief valves 218*a*-218*c*, and effluent pumps 216*a*-216*c* (collectively, effluent pumps 216), respectively. At least one of relief valves 218*a*-218*c* is utilized to control pressure in the system 200. Effluent pumps 216 can be any suitable pump, such as a high-precision Quizix 5000 or 6000 series pump.

Effluent pump 216*a* is in fluid communication with effluent cell 215*a* via use of line L229 and three-way valve V209, effluent pump 216*b* is in fluid communication with effluent cell 215*b* via use of line L253 and three-way valve V250, and effluent pump 216*c* is in fluid communication with effluent cell 215*c* via use of line L287 and three-way valve V260. In some examples, effluent pump 216*a* is utilized with housings 201*a*-201*f* (and associated unconsolidated porous media 202*a*-202*f*), effluent pump 216*b* is utilized with housings 201*g*-2011 (and associated unconsolidated porous media 202*g*-2021), and effluent pump 216*c* is utilized with housings 201*m*-201*r* (and associated unconsolidated porous media 202*m*-202*r*).

In use, foam exiting the housings 201 (and associated unconsolidated porous media 202) can be directed to the effluent cells 215. The foam can then be successively retracted by effluent pumps 216 before being delivered to main cells 214 for visual analysis. For example, foam exiting the housing 201*a* (and associated unconsolidated porous media 202*a*) can be directed to effluent cell 215*a* via line L205, three-way valve V205, line L221, three-way valve V207, and line L226. The foam can then be successively retracted by the effluent pump 216*a* before being delivered to main cell 214*a* for visual analysis via lines L229, L227, L222, L207 and associated valves V209, V208, V222. Additionally, or alternatively, the foam can be delivered to main cell 214*b* for visual analysis via lines L227, 225 and associated valves V209, V208, and V225. In a similar manner, foam exiting the other housings 201 (and associated unconsolidated porous media 202) can be directed to effluent cells 215 and successively retracted by effluent pumps 216 before being delivered to main cells 214 for visual analyses.

Foam characteristics and foam properties can be observed, monitored, and/or recorded via use of cameras 220*a*-220*f* (collectively, cameras 220), such as a high-resolution camera. The cameras 220 can be positioned at a location peripheral to the main cells 214 (foam visualization chamber). At such a location, the camera 220 (or camcorder) can observe, monitor, and/or record foam characteristics and foam properties via a window (or multiple windows), in a similar manner as window 121. For example, the cameras 220 can be utilized to record, monitor, and/or observe at least a portion of the foam decay process. Additionally, or alternatively, other equipment or instruments for evaluating, characterizing, or analyzing the foam can be utilized. For example, or camcorders and high-resolution camcorders can be utilized.

Unconsolidated porous media is defined above. In some examples, the unconsolidated porous media 202 (for example, unconsolidated porous media 202*a*, 202*d*, 202*r*, etc.) in the housings 201 can have, independently, a depth along a flow axis of about 1 inch to about 40 inches, such as from about 5 inches to about 35 inches, such as from about 10 inches to about 30 inches, such as from about 15 inches to about 25 inches, such as from about 15 inches to about 20 inches or from about 20 inches to about 25 inches. The flow axis is the axial direction along the length of the housings

201. The flow of gas from gas cylinders 203 and the flow of the foaming composition are in the same direction.

In some embodiments, a hydrocarbon oil is disposed in one or more of the housings 201. In at least one embodiment, a hydrocarbon oil is disposed in one or more of the unconsolidated porous media 202 that is packed in the housings 201. Other dispositions of the hydrocarbon oil are contemplated. The hydrocarbon oil can be delivered from oil unit 231*b* to the housings 201 (and unconsolidated porous media 202) via oil pump 231*a* and line L214 and/or line L234. Brine can be delivered from brine unit 208*b* to the housings 201 (and unconsolidated porous media 202) via brine pump 208*a* and line L213 and/or line L235. One or more foaming compositions (a mixture of brine and surfactant) can be made by use of the appropriate lines and valves in the system 200.

Although methods of the present disclosure are described with reference to apparatus 100 of FIG. 1A, methods described herein are applicable to apparatus 130 (FIG. 1B) and to system 200.

In some embodiments, a method of generating foam (and/or analyzing foam properties) includes delivering a foaming composition and a gas to a housing (for example, housing 101) at a pressure of about 500 psi to about 6,000 psi and a temperature of about 35° C. to about 150° C. Other pressures and temperatures are contemplated. An unconsolidated porous media (for example, unconsolidated porous media 102*a*, 102*b*, 102*c*) is disposed in, located in, housed in, or otherwise contained in the housing 101 (for example, housing 101*a*, 101*b*, 101*c*, respectively). As described above, the foaming composition is a mixture of brine and surfactant, for example, a mixture of brine from brine unit 108*b* and surfactant from surfactant unit 109*b*.

The method can further include flowing the foaming composition and the gas through the housing 101. The method can further include forming or creating a foam. The foam can be formed or created via the interaction of the foaming composition, the gas, the unconsolidated porous media, or combinations thereof. In some embodiments, the unconsolidated porous media can be saturated with an aqueous solution (for example, brine) and/or an oil (for example, a hydrocarbon oil) prior to forming the foam.

The method can further include directing the foam from the housing 101 to a foam visualization chamber (for example, the main cell 114). The foam visualization chamber is in fluid communication with the housing. The foam can be collected in an effluent cell (for example, effluent cell 115), which is in fluid communication with the housing 101, prior to directing the foam to the foam visualization chamber.

In some examples, the foam located in the foam visualization chamber (for example, the main cell 114) can be observed, imaged, characterized, monitored, evaluated, and/or determined by use of a camera, camcorder, characterization instrument, or other device (for example, camera 120). In at least one embodiment, the method includes observing, imaging, characterizing, monitoring, evaluating, and/or determining a property or characteristic of the foam. A non-limiting example of the property or characteristic of the foam is the foam decay process.

In some embodiments, the pressure in the foam visualization chamber (for example, the main cell 114) can be maintained at a desired pressure (for example, a pressure at which the foaming composition and/or the gas is delivered to the housing) before, during, and/or after observation, evaluation, and/or characterization of the foam. For example, the pressure can be maintained in foam visualization chamber while concurrently observing a decay of the foam in the foam visualization chamber.

The method can further include monitoring, measuring, and/or determining one or more foam characteristics when the foam is in the foam visualization chamber (for example, the main cell 114). Such characteristics can include, but are not limited to, foam half-life, pressure drop through the unconsolidated porous media, and apparent viscosity of the foam. Monitoring, measuring, and/or determining one or more foam characteristics can include monitoring, measuring, and/or determining a pressure drop across the housing; monitoring, measuring, and/or determining an apparent viscosity (for example, via the pressure drop); monitoring, measuring, and/or determining a foam half-life; monitoring, measuring, and/or determining a pressure drop through the unconsolidated porous media, or combinations thereof. Other characteristics are contemplated.

In at least one example, the method further includes monitoring, measuring, and/or determining a pressure drop across the unconsolidated porous media for a steady state, and/or commencing the directing operation in response to reaching the steady state. This directing operation refers to the operation of directing the foam from the housing to a foam visualization chamber.

In some embodiments, the method can further include adjusting or varying one or more parameters utilized in operating the apparatus or systems described herein. The one or more parameters can include the foaming composition delivered, the gas delivered, a surfactant concentration, a gas fraction, an injection rate of the surfactant and/or gas, a total injection rate, an operating pressure, an operating temperature, an oil saturation in unconsolidated porous media, a salinity, or combinations thereof, based on the measured one or more foam characteristics. Other parameters are contemplated.

These aforementioned one or more parameters can be utilized with the method during delivery of the foaming composition, delivery of the gas, flow of the foaming composition and/or the gas, formation of the foam, directing the foam, and/or measurement of the foam. For example, the foaming composition delivered can be a first foaming composition having a first surfactant concentration, As another example, the first foaming composition can be delivered at a first injection rate.

If desired, the adjusted parameter can then be used to deliver a second foaming composition, a second gas, a second foaming composition having a second surfactant concentration, a second gas fraction, a second total injection rate, a second injection rate of a surfactant and/or a gas, a second operating pressure, a second operating temperature, a second oil saturation in unconsolidated porous media, a second salinity, or combinations thereof. For example, the second foaming composition, the second gas, and so forth can, individually, be the same as or different from the first foaming composition, the first gas, and so forth.

In some embodiments, a gas (such as gas contained in gas cylinder 103) such as a hydrocarbon gas (for example, methane), $CO_2$, $N_2$, air, argon (Ar), or combinations thereof, among other gases, can be utilized to form the foam along with, for example, the foaming composition and the unconsolidated porous media. Other gases are contemplated. Illustrative, but non-limiting, surfactants and foaming compositions are described below.

In at least one embodiment, the gas can include a plurality of gases. The plurality of gases can include a first gas, a second gas, and so forth. In some embodiments, an amount of a first gas (for example, a hydrocarbon gas (for example, methane), $CO_2$, $N_2$, air, Ar, or combinations thereof) that is from about 70 wt % to about 100 wt %, such as from about 70 wt % to about 99 wt %, such as from about 75 wt % to about 95 wt %%, such as from about 80 wt % to about 90 wt %, such as from about 80 wt % to about 85 wt % or from about 85 wt % to about 90 wt %, based on a total weight of the first gas, a second gas, and so forth. Any of the foregoing numbers can be used singly to describe an open-ended range or in combination to describe a close-ended range. Higher and lower amounts of the first gas are contemplated.

In some embodiments, the gas can include an amount of a second gas. In one example, the second gas includes a hydrocarbon gas (for example, methane), $CO_2$, $N_2$, air, Ar, or combinations thereof, among other gases. The second gas is different from the first gas. The amount of the second gas can be about 0 wt % to about 30 wt %, such as from about 1 wt % to about 30 wt %, such as from about 5 wt % to about 25 wt %, such as from about 10 wt % to about 20 wt %, such as from about 10 wt % to about 15 wt % or from about 15 wt % to about 20 wt %, based on the total weight of the first gas, a second gas, and so forth. Any of the foregoing numbers can be used singly to describe an open-ended range or in combination to describe a close-ended range. Higher and lower amounts of the second gas are contemplated.

Unlike conventional technologies for evaluating performance at lab-scale that fail to reproduce reservoir conditions, embodiments described herein can reproduce reservoir conditions. As a result, large-scale enhanced oil recovery (EOR) operations can rely on embodiments described herein with respect to, for example, determining appropriate conditions for oil recovery such as surfactant type, surfactant concentration, foam quality (for example, gas fraction), and injection rate. Further, conventional static mixing (also known as bulk foam generation) techniques, for example, fail to reproduce the foam generation and collapse modes of real-world propped fractures due to the lack of a pore structure. In addition, even those conventional foam generation systems that have attempted to reproduce the pore structure of a propped fracture via consolidated cores have fallen short due to the consolidated nature of the core. Embodiments described herein overcome such deficits of conventional technologies.

Lab-scale EOR foam generation techniques of the prior art have proven to be inaccurate and cumbersome. For example, conventional apparatus and methods have failed to reproduce real-world reservoir conditions when it comes to overall length of the flow path through the porous media, generally being only a few inches in conventional lab-scale apparatus. Conventional EOR lab-scale foam generation techniques have also generally failed to fully reproduce reservoir conditions when it comes to pressure and temperature. Finally, conventional EOR foam surfactant screening apparatus are cumbersome and time consuming, often requiring thorough cleaning between different surfactants. Such problems with conventional technologies are overcome by embodiments of the present disclosure.

The following examples are put forth so as to provide those of ordinary skill in the art with a complete disclosure and description of how to make and use embodiments of the present disclosure, and are not intended to limit the scope of embodiments of the present disclosure. Efforts have been made to ensure accuracy with respect to numbers used (for example, amounts, dimensions, et cetera) but some experimental errors and deviations should be accounted for.

Examples

In some examples, foam was generated using methane with various foaming compositions. Other gases can be utilized as described above. As shown in the examples, the methane foam generation can be made at high-pressure and high-temperature conditions. In the examples, zwitterionic surfactants were employed. However, other types of surfactants are contemplated and can be utilized with methods, systems, and apparatus described herein such as anionic, cationic, nonionic, and amphoteric, among others. Moreover, other types of zwitterionic surfactants, concentrations, et cetera, are contemplated and can be utilized with methods, systems, and apparatus described herein. Foam performance sensitivity to various foam parameters and operating conditions, which include, but are not limited to, surfactant concentration, gas fraction, total injection rate, operating pressure, and salinity, among other parameters/conditions was investigated.

Experiments were conducted on water-wet sandpacks using methane gas at about 3,500 psi and about 115° C. The experiments were conducted on sandpacks prepared with a water-wet sand mixture of 40/70 and 20/40 mesh grain sizes frequently used as proppant in hydraulic fracturing, though other mesh grain sizes are contemplated.

The apparatus used for testing is shown in FIG. 1A (and/or FIG. 1B). At least a portion of the apparatus was fabricated from Hastelloy tubing and/or other materials/ components that are configured to safely operate at high-pressure and high-temperature conditions. In some examples, the foam is generated in the sandpack through co-injection (or co-delivery) of the foaming composition and gas and propagated through the sandpack towards the effluent end. Injection or delivery can be sequential, if desired. Further, injection or delivery of the foaming composition can be performed intermittently while the gas is injected or delivered; and/or injection or delivery of the gas can be performed intermittently while the foaming composition is injected or delivered.

The foaming composition can be formed prior to, during, and/or after injection/delivery to the apparatus. For example, brine and surfactant can be made into a foaming composition and then be injected or delivered to the apparatus. As another example, brine (in suitable media) and surfactant (in suitable media) can be individually injected in a sequential manner and/or co-injected. Pumps (such as pump 110 in FIG. 1A and FIG. 1B), such as high-precision Quizix 5000 or 6000 series pumps, can be utilized to inject brine, surfactant (or solution thereof), foaming composition, or combinations thereof. Pressure regulation pumps 111 can be employed to pressurize the cells continuously. Any suitable number of pumps can be used. For the examples, three pumps were utilized. Additionally, or alternatively, mass flow controllers and/or gas boosters (such as Haskel gas boosters) can be utilized, among other suitable equipment. The injection gas, such as a hydrocarbon gas (for example, methane), $CO_2$, $N_2$, or combinations thereof, is delivered using one or more pumps, mass flow controllers, and/or gas boosters, among other suitable equipment.

At the downstream end, the foam exiting the foam generator can be directed to an effluent cell and successively retracted by an effluent pump before being delivered to the main cell for visual analysis (this cell can be the foam visualization chamber). A camera or camcorder is utilized to record and/or observe at least a portion of the foam decay process. The cells, for example, the main cell and effluent cell, were equipped with glass windows to facilitate foam visualization. The glass windows are capable of housing fluids up to desired pressures and temperatures, such as a pressure of up to about 15,000 psi and/or a temperature of up to about 200° C. For example, cells (manufactured by Core Laboratories) were equipped with sapphire glass windows. Another pump was employed as a pressure regulation pump (PR) to pressurize the cells continuously.

During the foam generation tests described herein, certain components of the experimental setup, such as the gas and fluid lines, fluid injection pumps, foam generators, and effluent and main cells, were maintained at suitable temperatures, such as about 115° C. The fluid injection pumps and visual cells resided in ovens (for example, Shel Lab ovens) operating at a similar temperature. Heating tapes and temperature controllers can be used to heat and maintain the temperature of the fluid and gas lines, if desired.

FIGS. 2A-2C shows a schematic diagram of a system for in-situ foam generation and evaluation utilized for the Examples. As described above, the system can include the apparatus of FIG. 1A, FIG. 1B, or a similar apparatus. Such a system can include a plurality of foam generators distributed over a desired number of modules. In some embodiments, the system includes eighteen foam generators (for example, sandpacks) in total distributed equally over six modules, though higher and lower generators and/or modules are contemplated. Each module can include a fluid-delivering assembly, an array of three foam generators, and an effluent collection assembly. Each module or a particular sandpack can be employed to run foam generation tests autonomously of the other modules.

The unconsolidated porous media (for example, a sandpack) can be prepared according to the following non-limiting procedure. Sandpacks were prepared by tightly packing a mixture of 20/40 mesh (about 89% in weight) and 40/70 mesh (about 11% in weight) water-wet sands into 0.46 cm×101.6 cm (inner-diameter×length) Hastelloy tubing. During the packing process, the sand mixture was gradually poured into the tubing up to the top through a plastic funnel. Afterward, the tubing was stroked gently, which enabled the sand grains to, for example, settle down firmly and avoid significant grain segregations. Both sides of the sandpack were secured with glass wool to, for example, avoid any potential sand movement out of the sandpack during the test. The glass wool occupied a negligibly small length (about 0.5 cm) of the sandpack and had significantly higher fluid flow capacity than the sands. Moreover, there was no interaction between the glass wool and injected fluids.

Two sandpack samples (3 inches in height and ¼ inch in diameter) were formed by packing a sand mixture into aluminum tubing. The samples were then imaged using an Xradia Context micro-CT scanner (ZEISS) to provide the petro-physical properties of the sandpacks in Table 1.

TABLE 1

| Property | Value |
|---|---|
| Grain sizes, μm | 212-840 |
| Sand mixture density, g/cm³ | 2.65 |
| Porosity, % | 32.5-35.5 |
| Pore volume, cm³ | 5.3-5.6 |

A foaming composition can be made in accordance with the following non-limiting parameters. Generally, the foaming composition can include one or more surfactants, brine, and one or more optional components.

The surfactant can be an anionic surfactant, cationic surfactant, zwitterionic surfactant, non-ionic surfactant, amphoteric surfactant, or combinations thereof. In solution, the surfactant can be in, for example, its ionic form, non-ionic form, zwitterionic form, or combinations thereof.

The foaming composition can include one or more salts. The one or more salts include a cation and an anion. The cation and/or the anion can be monoatomic or polyatomic. Monoatomic cations can include an alkali metal (for example, Li, Na, K, Rb, and Cs), an alkaline earth metal (for example, Be, Mg, Ca, Sr, and Ba), a transition metal (for example, Fe, Zn, Mn), or combinations thereof. Polyatomic cations can include ammonium ($NR_4^+$, wherein each R is independently H or alkyl), pyridinium, or combinations thereof. Anions can include one or more elements from Group 15-Group 17 of the periodic table of the elements, such as N, P, S, O, F, Cl, Br, I, or combinations thereof. Monoatomic anions can include a halide (F, Cl, Br, and I), oxides, or combinations thereof. Polyatomic anions can include a carbonate, a nitrate, a sulfate, a sulfonate, a tosyl, a trifluoromethansulfonate, a phosphate, a phosphonate, a hydroxide, oxoanion, or combinations thereof. Other ions are contemplated.

In a solution or suspension, the salt(s) may exist as one or more ions, for example, one or more anions (for example, Cl, Br, I, Sr, et cetera) and one or more cations (for example, Na, K, Ca, Mg, et cetera) may exist in the solution or suspension. For example, when the foaming composition includes KCl, $K^+$ and $Cl^-$ ions (as well as the solid salt, KCl) can be in the foaming composition. In some examples, the aqueous material is brine that includes water and one or more salts (or ions thereof).

Illustrative, but non-limiting, examples of salts include sodium chloride (NaCl), sodium bromide (NaBr), sodium iodide (NaI), sodium sulfate ($Na_2SO_4$), potassium chloride (KCl), potassium bromide (KBr), potassium iodide (KI), potassium nitrate ($KNO_3$), calcium chloride ($CaCl_2$), calcium bromide ($CaBr_2$), calcium iodide ($CaI_2$), calcium sulfate ($CaSO_4$), calcium oxide (CaO), magnesium chloride ($MgCl_2$), magnesium sulfate ($Mg_2SO_4$), and/or $Mg(OH)_2$, among others. One or more of these salts can be hydrates, for example, hexahydrates. In some embodiments, the brine composition comprises calcium chloride, magnesium chloride, and/or ions thereof. In some embodiments, the brine composition comprises sodium chloride, calcium chloride, magnesium chloride, and/or ions thereof.

The foaming composition can include any suitable salinity, excluding the presence of surfactants. The salinity can be based on one or more of the aforementioned salts. In some embodiments, a salinity of the foaming composition is from about 500 ppm to about 1,000,000 ppm, such as from about 500 ppm to about 500,000 ppm. In at least one embodiment, the salinity of the foaming composition (in ppm) can be 500, 1,000, 5,000, 10,000, 20,000, 30,000, 40,000, 50,000, 60,000, 70,000, 80,000, 90,000, 100,000, 120,000, 140,000, 160,000, 180,000, 200,000, 220,000, 240,000, 260,000, 280,000, 300,000, 320,000, 340,000, 360,000, 380,000, 400,000, 420,000, 440,000, 460,000, 480,000, 500,000, 520,000, 540,000, 560,000, 580,000, 600,000, 620,000, 640,000, 660,000, 680,000, 700,000, 720,000, 740,000, 760,000, 780,000, 800,000, 820,000, 840,000, 860,000, 880,000, 900,000, 920,000, 940,000, 960,000, 980,000, or 1,000,000, or ranges thereof. Each of the foregoing numbers can be preceded by the word "about," "at least about," "less than about," or "more than about" and any of the foregoing numbers can be used singly to describe an open-ended range or in combination to describe a close-ended range. For example, the salinity of the foaming composition is about 500 ppm or more, about 50,000 ppm to about 200,000 ppm, about 500,000 ppm or less, or at least about 100,000 ppm. A higher or lower salinity is contemplated.

In some embodiments, the foaming composition has a salinity that is from about 500 ppm to about 500,000 ppm, such as from about 75,000 ppm to about 450,000 ppm, such as from about 100,000 ppm to about 400,000 ppm, such as from about 150,000 ppm to about 300,000 ppm, such as from about 175,000 to about 250,000 ppm, excluding the presence of surfactants. Any of the foregoing numbers can be used singly to describe an open-ended range or in combination to describe a close-ended range. Other periods are contemplated. A higher or lower salinity is contemplated.

The foaming composition can be prepared by introducing a surfactant to a brine to form a mixture, and stirring or otherwise blending the mixture for a period of about 5 h to about 24 h, such as about 10 h to about 15 h, such as about 12 h. Any of the foregoing numbers can be used singly to describe an open-ended range or in combination to describe a close-ended range. Other periods are contemplated. Stirring or blending can be performed by suitable methods and apparatus.

Various illustrative, but non-limiting, examples of surfactants were investigated. Table 2 shows characteristics of the example Surfactants A1 and A2 used for the tests.

TABLE 2

| Surfactant | Charge | Active matter, % | Component | MW, g/mol | Freezing point, ° C. |
|---|---|---|---|---|---|
| A1 | Zwitterionic | 33.21 | Amido amine oxides | 307 | — |
| A2 | Zwitterionic | 48.2 | Sultaines | 342.5 | — |

Both of Surfactant A1 and Surfactant A2 showed compatibility with high-pressure and high-temperature conditions during the phase behavior and bulk foam tests.

Table 3 shows the composition of the synthetic brine utilized for the experiments. The synthetic brine was stirred for about 12 hours to ensure the complete dilution of the salts. The surfactant concentration was calculated based on its active matter percentages.

TABLE 3

| Salt | Ion | Concentration, ppm | Ion | Concentration (ppm) |
|---|---|---|---|---|
| NaCl | $Na^+$ | 54306.54 | $Cl^-$ | 83739.32 |
| $MgCl_2 \cdot 6H_2O$ | $Mg^{2+}$ | 1255.73 | $Cl^-$ | 3663.40 |
| $CaCl_2 \cdot 2H_2O$ | $Ca^{2+}$ | 16451.66 | $Cl^-$ | 29106.28 |
| $Na_2SO_4$ | $Na^+$ | 39.99 | $SO_4^{2-}$ | 83.55 |
| $SrCl_2 \cdot 6H_2O$ | $Sr^{2+}$ | 1319.31 | $Cl^-$ | 1067.65 |
| KCl | $K^+$ | 4689.12 | $Cl^-$ | 4251.78 |
| $BaCl_2 \cdot 2H_2O$ | $Ba^{2+}$ | 16.93 | $Cl^-$ | 8.74 |
| Total | | 78079.29 | | 121920.71 |

As shown in Table 3, the synthetic brine has a salinity of about 200,000 ppm. The foaming compositions used for the experiments were prepared in this synthetic brine.

Example Foam Generation. Foam generation can be performed in each module simultaneously, if desired. In some embodiments, foam generation is performed in each independent module according to the following non-limiting procedure. The modules were prepared and installed. The sandpacks were then flooded with $CO_2$ to remove the bulk air from the pore space and then evacuated together with flow lines for about one hour to remove the $CO_2$. Brine was then injected into the sandpacks to saturate and gradually pressurize the sandpacks to an operating pressure of about 3,500 psi. More than ten pore volumes of brine were injected to fully saturate the sandpacks. Once the saturation process was concluded, the temperature of the whole set-up was steadily increased to about 115° C. and maintained at this temperature throughout the experiments. After the system was thermally stabilized, methane gas and the foaming composition were charged into the corresponding pumps and pressurized to the operating pressure of about 3,500 psi. A pressure regulation pump was employed to control the pressure in the visual cells using methane gas.

Before conducting the foam tests, brine was injected into the sandpack at different flow rates (for example, about 1 cm³/min, about 2 cm³/min, about 3 cm³/min, and about 5 cm³/min) to determine absolute permeability. The absolute permeability of the sandpacks to brine at the experimental conditions was found to be in the range of about 64-65 darcies.

In some embodiments, foam generation can include utilization of the apparatus 100 shown in FIG. 1A and/or the apparatus 130 shown in FIG. 1B. In at least one embodiment, foam generation includes one or more of the following operations:

(a) Connect an inlet of one of the three sandpacks in a module to the gas pump and the surfactant pump via a three-way valve. The other two sandpacks are temporarily isolated from the system.

(b) Co-inject a gas (for example, a hydrocarbon gas such as methane, $CO_2$, $N_2$, and/or combinations thereof, et cetera) and the foaming composition at a specified injection rate and a desired gas/water fraction (or foam quality). In one example, methane gas is utilized.

(c) Direct the generated foam to the effluent cell by successive retracting using the effluent pump. Pressure in the cell can be maintained at about 3,500 psi through a back-pressure pump, though other pressures are contemplated based on the desired application.

(d) Plot the pressure drops across the foam generators to, for example, track variations during the foaming process. Plotting can be performed continuously and/or intermittently, depending on, for example, the application.

(e) Upon reaching steady state, or near steady state, divert the foam to the primary visual cell maintained at a pressure of, for example, about 3,500 psi, to observe bulk foam stability, though other pressures are contemplated based on the desired application.

(f) Re-divert the foam to the effluent cell when the foam column fills the entire cell. Here, all adjacent valves of the main cell can be closed to isolate it from the rest of the system. High-resolution cameras can be utilized to observe and/or record, for example, foam degradation processes inside the visual cell.

(g) Before starting a new test, close all the pumps and the inlet and outlet of the sandpacks. The pressure of the rest of the system can be brought to a pressure of about 3,500 psi, though other pressures are contemplated based on the desired application.

After foam in the main cell collapsed to more than about 50% of its initial height, a cleaning process can be performed. Here, the cell can be flushed with brine followed by flushing with a gas (for example, the hydrocarbon gas such as methane, $CO_2$, $N_2$, and/or combinations thereof, et cetera). Once the cell contains only the gas(es) utilized for flushing (or adequately low amounts of other species), a similar foam testing procedure can be repeated for other sandpacks and/or modules if desired. In one example, the cell was flushed with methane, and once the main cell contained only methane, foam testing was performed on other sandpacks and/or modules.

As used herein, the term "transient" refers to the variations of the measured quantity with changes in time or other suitable parameter against which the quantity is being measured. As used herein, the term "steady state" refers to the quantity being measured does not vary with respect to changes in time or other suitable parameter it is measured against. In the case of foam evaluation, for example, pressure drop and apparent viscosity are measured with respect to time. A condition when the pressure drop or apparent viscosity do not change with time or against another parameter is called a steady state condition.

The apparatus and methods described herein enable, for example, evaluation of transient foam performance and steady state foam performance. As used herein, the term "foam performance" refers to the characteristics of the foam in terms of the pressure drop, apparent viscosity, and foam stability (i.e., a foam's half-life).

In some examples, the pressure drops across the sandpacks and apparent viscosity of foam were adopted as measures of foam strength and discerned for the surfactants at a pressure/temperature of about 3,500 psi/about 115° C. As used herein, the term "pressure drop" refers to the difference between the pressure across a medium when a foam is being generated, existing, or flowing through the medium and the operating pressure or initial pressure prior to the beginning of foam injection or generation process. The pressure drop signifies the increase in the pressure across the medium due to the presence (i.e., generation and/or flow) of the foam with respect to some reference or initial operating pressure.

As used herein, the term "apparent viscosity" refers to the bulk viscosity of the foam measured using an instrument and/or the dynamic viscosity calculated using the Darcy's equation across the porous medium. Apparent viscosity is defined as the ratio of shear stress and shear rate across the medium.

The foam generation and performance evaluation were conducted in two phases, phase (1): initial foam generation and evaluation tests; and phase (2): foam performance sensitivity tests.

Phase (1) was designed to better understand, for example, foamability and foam stability, of each surfactant for a set of arbitrarily-chosen foam parameters. Eight experiments were conducted with each surfactant at two different foam qualities, surfactant concentrations, and total injection rates. The pressure drop profiles for the tests were monitored to analyze the transient and steady state properties of foam in each case. Subsequently, bulk foam stability analysis was performed by monitoring foam decay in the primary visual cells to quantify the foam stability of each surfactant. The half-life (or fractional column height) of the foam was estimated to demonstrate the foam stability.

Phase (2) was designed to, for example, examine foam performance sensitivity. Table 4 provides a summary of foam performance of Surfactants A1 and A2 utilized in the eight foam tests. Foam performance measures of surfactants, such as slowest and fastest time to reach steady state, average time to reach steady state, and highest and lowest apparent viscosity are shown, however other performance measures can also be utilized. In Table 4, the values of foam parameters are given in the parenthesis.

TABLE 4

| Foam performance (at steady state) | Surfactant A1 | Surfactant A2 |
|---|---|---|
| Fastest time to steady state, min | 24 (0.7 wt %, 80% quality, 8 cm³/min) | 20 (0.7 wt %, 80% quality, 8 cm³/min) |
| Slowest time to steady state, min | 40 (0.4 wt %, 90% quality, 8 cm³/min) | 40 (0.7 wt %, 90% quality, 5 cm³/min) |
| Average time to steady state, min | 31.4 | 29.3 |
| Highest apparent viscosity, cP | 25.6 (0.7 wt %, 90% quality, 5 cm³/min) | 29.8 (0.4 wt %, 90% quality, 5 cm³/min) |
| Lowest apparent viscosity, cP | 12.3 (0.4 wt %, 80% quality, 5 cm³/min) | 13 (0.7 wt %, 80% quality, 8 cm³/min) |

Figure 3:
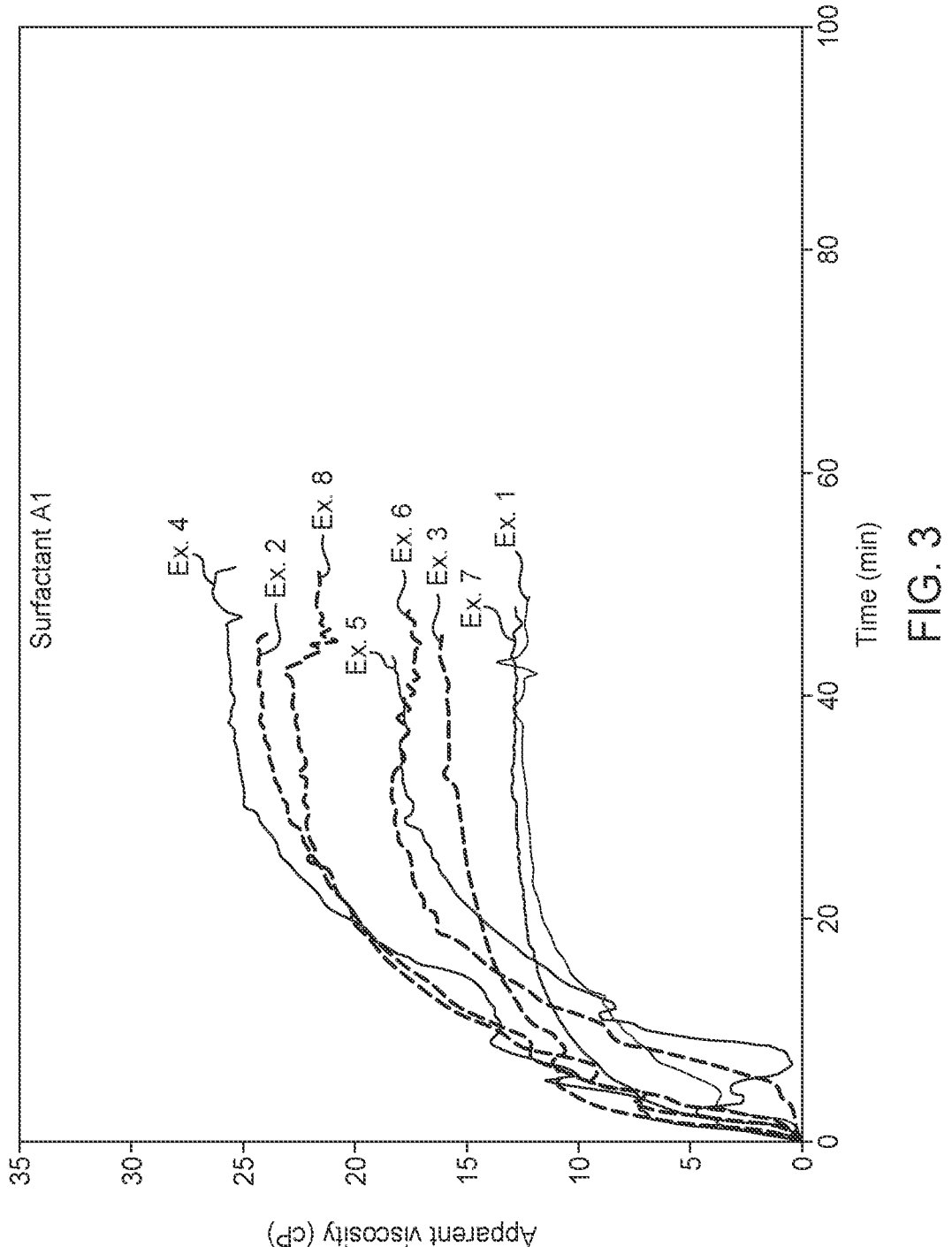
FIG. 3 shows exemplary data of the apparent viscosity profile of Surfactant A1 in the eight foam generation tests—illustrating the performance of Surfactant A1 during phase 1—according to at least one embodiment of the present disclosure.
Figure 4:
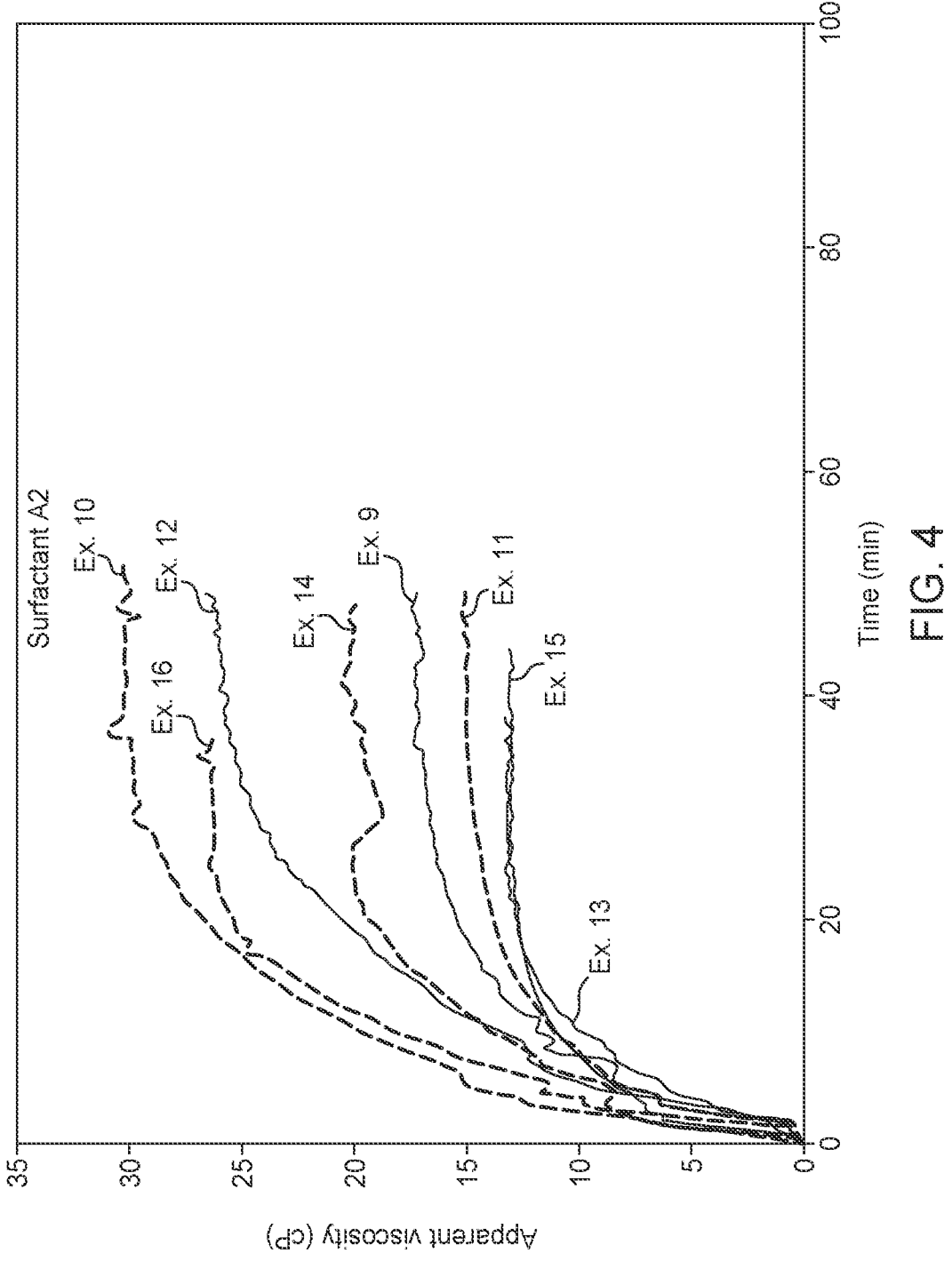
FIG. 4 shows exemplary data of the apparent viscosity profile of Surfactant A2 in the eight foam generation tests—illustrating the performance of Surfactant A2 during phase 1—according to at least one embodiment of the present disclosure.

The apparent viscosity profiles (proportional to pressure drop) of Surfactant A1 and Surfactant A2 are shown in the exemplary data of FIG. 3 and FIG. 4, respectively. Table 5A shows the concentration, foam quality, and injection rate using Surfactant A1 for individual examples (FIG. 3). Table 5B shows the concentration, foam quality, and injection rate using Surfactant A2 for individual examples (FIG. 4).

TABLE 5A

| Example | Concentration, wt % | Foam quality, % | Injection rate, cm³/min |
|---|---|---|---|
| Ex. 1 | 0.4 | 80 | 5 |
| Ex. 2 | 0.4 | 90 | 5 |
| Ex. 3 | 0.7 | 80 | 5 |
| Ex. 4 | 0.7 | 90 | 5 |
| Ex. 5 | 0.4 | 80 | 8 |
| Ex. 6 | 0.4 | 90 | 8 |
| Ex. 7 | 0.7 | 80 | 8 |
| Ex. 8 | 0.7 | 90 | 8 |

TABLE 5B

| Example | Concentration, wt % | Foam quality, % | Injection rate, cm³/min |
|---|---|---|---|
| Ex. 9 | 0.4 | 80 | 5 |
| Ex. 10 | 0.4 | 90 | 5 |
| Ex. 11 | 0.7 | 80 | 5 |
| Ex. 12 | 0.7 | 90 | 5 |
| Ex. 13 | 0.4 | 80 | 8 |
| Ex. 14 | 0.4 | 90 | 8 |
| Ex. 15 | 0.7 | 80 | 8 |
| Ex. 16 | 0.7 | 90 | 8 |

As used herein, the term "foam quality" refers to the percent quantity of gas in the foam. Foam quality is defined as a ratio of gas flow rate to the total flow rate (gas flow rate+liquid flow rate). Foam quality is also known as gas fraction.

Table 6 shows foam stability (half-life) measurements of the Surfactant A1 and Surfactant A2. The half-life data is of steady state foam for various surfactants in the foam tests. Both Surfactant A1 and Surfactant A2 showed good foaming properties.

TABLE 6

| Foam half-life, min | Surfactant A1, min | Surfactant A2, min |
|---|---|---|
| Highest | 825 | 1,200 |
| Lowest | 180 | 410 |
| Average | 363.8 | 867 |

Figure 5:
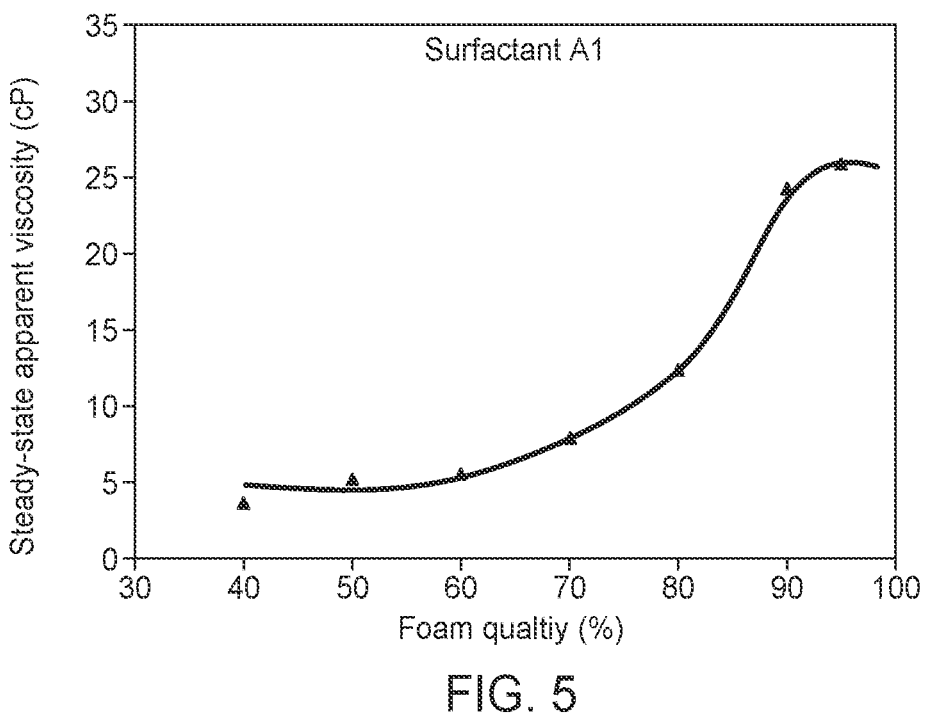
FIG. 5 shows exemplary data illustrating steady state apparent viscosity with increasing foam quality for Surfactant A1 at an injection rate of about 5 cm³/min and a surfactant concentration of about 0.4 wt % according to at least one embodiment of the present disclosure.

FIG. 5 shows exemplary data illustrating steady state apparent viscosity with increasing foam quality for Surfactant A1 at an injection rate of about 5 cm³/min and a surfactant concentration of about 0.4 wt %. The results indicated that steady state apparent viscosity increases with increasing foam quality for Surfactant A1. The transition foam quality is in the proximity of about 95%. Beyond this point, shear-thinning is observed.

Figure 6:
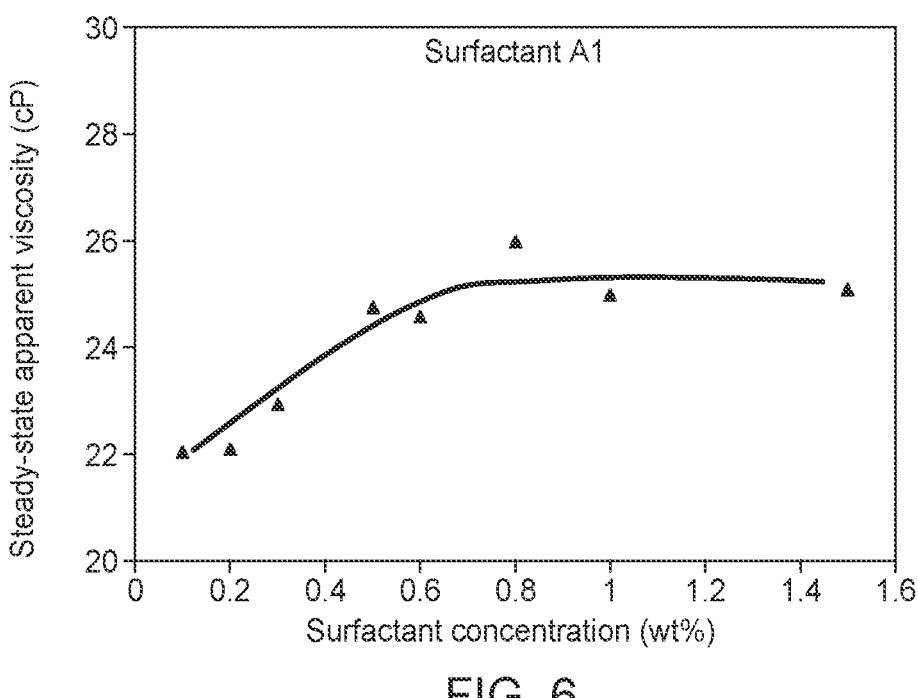
FIG. 6 shows exemplary data illustrating steady state apparent viscosity variation with respect to concentration for Surfactant A1 at an injection rate of about 5 cm³/min and a foam quality of about 90% according to at least one embodiment of the present disclosure.

The effects of concentration on foam characteristics was investigated for Surfactant A1. FIG. 6 shows the steady state apparent viscosity variation with respect to concentration of Surfactant A1, respectively. For the data presented in FIG. 6, the injection rate was about 5 cm³/min and the foam quality was about 90%. The data showed that steady state foam strength increased with concentration up to a certain concentration.

Figure 7:
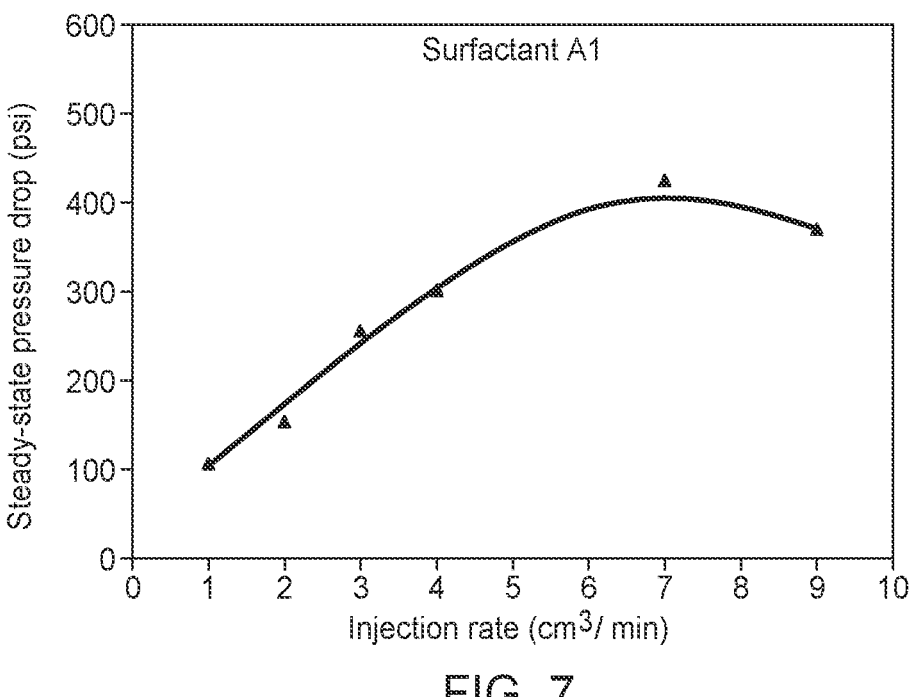
FIG. 7 shows exemplary data illustrating steady state pressure drop variations with respect to the injection rate for Surfactant A1 at a surfactant concentration of about 0.4 wt % and a foam quality of about 90% according to at least one embodiment of the present disclosure.
Figure 8:
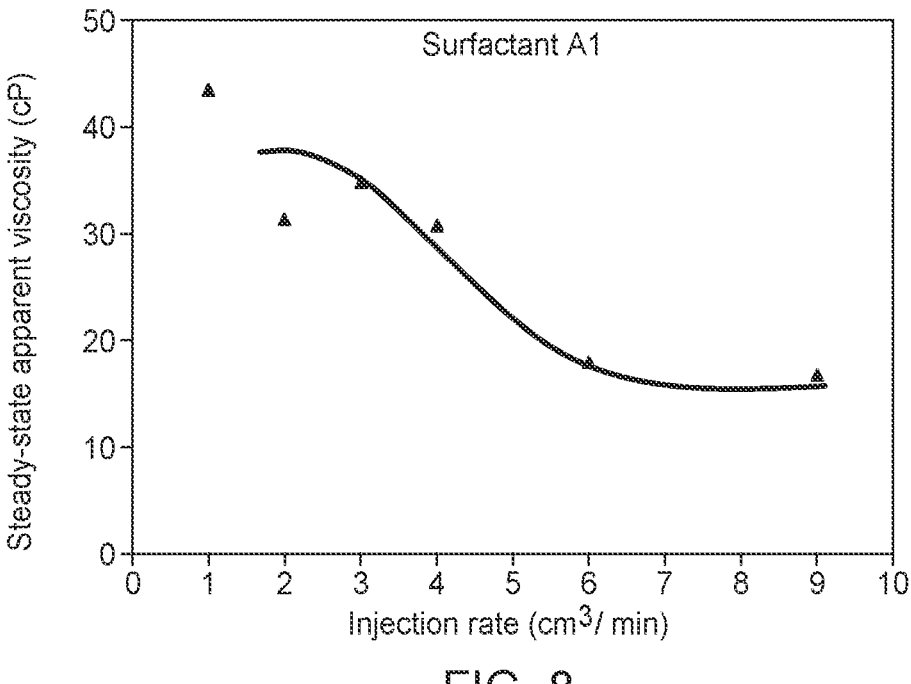
FIG. 8 shows exemplary data illustrating steady state apparent viscosity variations with respect to the injection rate for Surfactant A1 at a surfactant concentration of about 0.4 wt % and a foam quality of about 90% according to at least one embodiment of the present disclosure.

Injection rate sensitivity results for Surfactant A1 were determined. The steady state pressure drop variations and steady state apparent viscosity variations with respect to the injection rate of Surfactant A1 are shown in FIG. 7 and FIG. 8, respectively. The tests for the data presented in FIG. 7 and FIG. 8 were conducted at a surfactant concentration of about 0.4 wt % and a foam quality of about 90%. The injection rate sensitivity results indicated that the pressure drop increases with the flow rate quasi-linearly.

Figure 9:
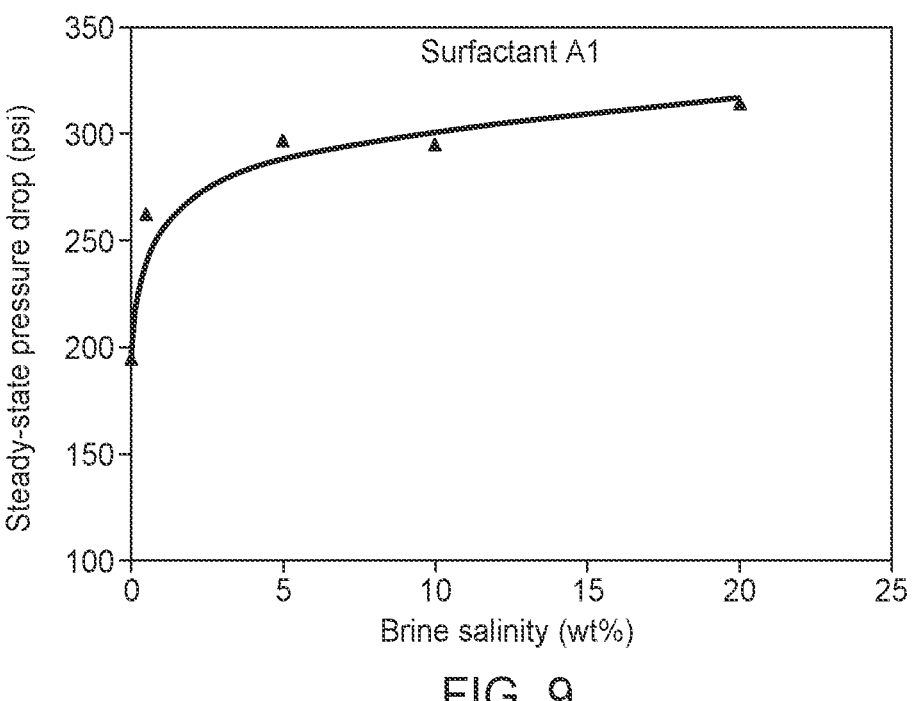
FIG. 9 shows exemplary data illustrating steady state pressure drop (foam strength) variation with respect to salinity for Surfactant A1 at a foam quality of about 90%, a concentration of about 0.7 wt %, and a total injection rate of about 5 cm³/min according to at least one embodiment of the present disclosure.

Salinity tests were also performed for brine salinities ranging from about 0.05 wt % to about 20 wt % using Surfactant A1 at an operating pressure of about 3,500 psi, a foam quality of about 90%, a surfactant concentration of about 0.7 wt %, and a total injection rate of about 5 cm³/min. The sandpack was initially saturated with similar salinity brine as the foaming composition. FIG. 9 shows exemplary data for the test. As shown in FIG. 9, the foam strength increased with the salinity for Surfactant A1. The data indicated that the high salinity can result in improved foam performance.

Figure 10:
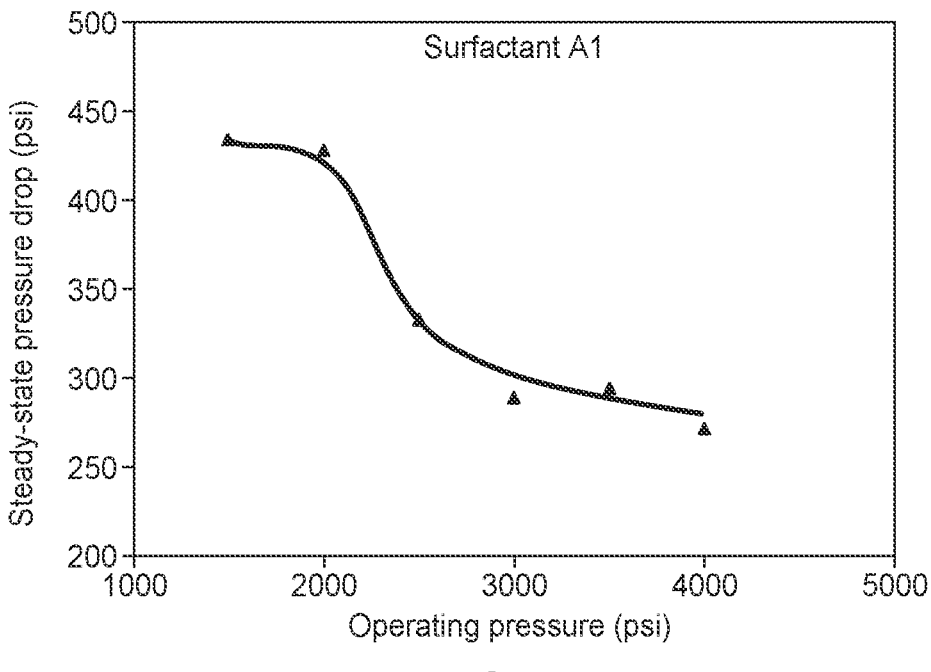
FIG. 10 shows exemplary data of steady state pressure drop variation with respect to operating pressure for Surfactant A1 at a foam quality of about 90%, an injection rate of about 5 cm³/min, and a surfactant concentration of about 0.4 wt % according to at least one embodiment of the present disclosure.

Pressure sensitivity tests were also performed to determine the effect of operating pressure on foam strength. Exemplary, but non-limiting, results for Surfactant A1 are shown in FIG. 10. The experiments for the data in FIG. 10 were performed at an injection rate of about 5 cm³/min, a surfactant concentration of about 0.4 wt %, and a foam quality of about 90%. The results indicated that foam strength decreased with the operating pressure for Surfactant A1.

Overall, the results illustrated that apparatus and methods described herein can be utilized for foam generation and foam evaluation for enhanced oil recovery. Numerous experiments can be conducted simultaneously at, for example, reservoir conditions or other conditions.

Embodiments of the present disclosure generally relate to apparatus and methods for foam generation, and to apparatus and methods for evaluation of foam systems for enhanced oil recovery. As described herein, the inventors have found, at least, foam generation systems and foam evaluation systems that can conduct numerous experiments simultaneously at reservoir conditions. Embodiments of the present disclosure can enable, for example, several foam-evaluation tests with varying chemicals and foam parameters at conditions that can mimic real-world applications.

Embodiments Listing

The present disclosure provides, among others, the following embodiments, each of which can be considered as optionally including any alternate embodiments:

Clause A1. A method of analyzing foam properties at reservoir conditions, comprising:

delivering a foaming composition and a gas to a housing at a pressure of about 500 psi to about 6,000 psi and a temperature of about 35° C. to about 150° C., the housing containing an unconsolidated porous media;

flowing the foaming composition and the gas through the housing;

forming a foam by an interaction of the foaming composition, the gas, and the unconsolidated porous media;

directing the foam from the housing to a visualization chamber, the visualization chamber in fluid communication with the housing; and measuring one or more foam characteristics via the visualization chamber Clause A2. The method of Clause A1, wherein the one or more foam characteristics comprise foam half-life, pressure drop through the unconsolidated porous media, apparent viscosity of the foam, or combinations thereof.

Clause A3. The method of Clause A1 or Clause A2, further comprising:

measuring a pressure drop across the housing;

measuring an apparent viscosity via a pressure drop across the housing; or a combination thereof.

Clause A4. The method of any one of Clauses A1-A3, further comprising maintaining the pressure in the visualization chamber and concurrently observing a decay of the foam in the visualization chamber.

Clause A5. The method of any one of Clauses A1-A4, further comprising varying one or more parameters, the one or more parameters comprising surfactant concentration, gas fraction, total injection rate, operating pressure, oil saturation in unconsolidated porous media, salinity, or combinations thereof.

Clause A6. The method of any one of Clauses A1-A5, further comprising adjusting the foaming composition delivered, the gas delivered, a surfactant concentration, a gas fraction, a total injection rate, an operating pressure, an oil saturation in unconsolidated porous media, a salinity, or combinations thereof, based on the measured one or more foam characteristics.

Clause A7. The method of any one of Clauses A1-A6, wherein the unconsolidated porous media in the housing has a depth along a flow axis of about 1 inch to about 40 inches.

Clause A8. The method of any one of Clauses A1-A7, further comprising imaging the foam in the visualization chamber via a camera.

Clause A9. The method of any one of Clauses A1-A8, further comprising:

saturating the unconsolidated porous media with a brine solution prior to forming the foam;

saturating the unconsolidated porous media with an oil prior to forming the foam;

or combinations thereof.

Clause A10. The method of any one of Clauses A1-A9, wherein the foaming composition comprises:

a surfactant, an ion thereof, or a combination thereof and a salt, an ion thereof, or a combination thereof, the salt being different from the surfactant.

Clause A11. The method of any one of Clauses A1-A10, wherein the gas comprises a hydrocarbon gas, $CO_2$, $N_2$, or combinations thereof.

Clause A12. The method of any one of Clauses A1-A11, wherein the unconsolidated porous media comprises sand.

Clause A13. The method of Clause A12, wherein the sand comprises a mixture of sand particles having differing shapes and sizes.

Clause A14. The method of any one of Clauses A1-A13, further comprising:

monitoring a pressure drop across the unconsolidated porous media for a steady state; and commencing, in response to reaching the steady state, the directing the foam from the housing to the visualization chamber.

Clause A15. The method of Clause A14, further comprising collecting the foam in a pressure controlled effluent cell prior to reaching the steady state.

Clause A16. The method of any one of Clauses A1-A15, wherein a salinity of the foaming composition is from about 500 ppm to about 500,000 ppm.

Clause B1. A method of forming a foam, comprising:

introducing a foaming composition and a gas to a housing of a system at a pressure of about 500 psi to about 6,000 psi and a temperature of about 35° C. to about 150° C., wherein:

the housing contains an unconsolidated porous media;

the system further includes a visualization chamber, the visualization chamber in fluid communication with the housing; and the gas comprises a hydrocarbon gas, $CO_2$, $N_2$, or combinations thereof; and forming a foam by an interaction of the foaming composition, the gas, and the unconsolidated porous media.

Clause B2. The method of Clause B1, wherein the foaming composition comprises:

a surfactant, an ion thereof, or a combination thereof; and a salt, an ion thereof, or a combination thereof, the salt being different from the surfactant.

Clause B3. The method of Clause B1 or Clause B2, wherein a salinity of the foaming composition is from about 500 ppm to about 500,000 ppm.

Clause C1. An apparatus for characterizing foam properties for enhanced oil recovery, the apparatus comprising:

a housing containing an unconsolidated porous media;

one or more pumps configured to deliver a foaming composition and a gas to the housing at a pressure of about 500 psi to about 6,000 psi;

one or more temperature control devices configured to heat the foaming composition and the gas at a temperature of about 35° C. to about 115° C.; and a visualization chamber in fluid communication with the housing, the visualization chamber configured to allow visualization of a foam produced in the housing.

Clause C2. The apparatus of Clause C1, wherein the unconsolidated porous media is hydrophobic.

Clause C3. The apparatus of Clause C1 or C2, wherein the unconsolidated porous media is hydrophilic.

Clause C4. The apparatus of any one of Clauses C1-C3, wherein the unconsolidated porous media in the housing has a depth along a flow axis of about 1 inch to about 40 inches.

Clause C5. The apparatus of any one of Clauses C1-C4, wherein the unconsolidated porous media comprises sand.

Clause C6. The apparatus of Clause C5, wherein the sand comprises a blend of sand particles having differing shapes and sizes.

Clause C7. The apparatus of any one of Clauses C1-C6, wherein the gas comprises a hydrocarbon gas.

Clause C8. The apparatus of any one of Clauses C1-C7, wherein the gas comprises about 70 wt % to about 99 wt % methane.

Clause C9. The apparatus of any one of Clauses C1-C8, wherein the gas comprises about 70 wt % to about 99 wt % $CO_2$.

Clause C10. The apparatus of any one of Clauses C1-C9, wherein the gas comprises about 70 wt % to about 99 wt % $N_2$.

Clause C11. The apparatus of any one of Clauses C1-C10, wherein a hydrocarbon oil is disposed within the unconsolidated porous media packed inside the housing.

Clause C12. The apparatus of any one of Clauses C1-C11, comprising a plurality of housings, each housing containing unconsolidated porous media, wherein the each of the plurality of housings is arranged in parallel fluid communication with the one or more pumps and the visualization chamber.

Clause C13. The apparatus of any one of Clauses C1-C12, wherein a salinity of the foaming composition is from about 500 ppm to about 500,000 ppm.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, process operation, process operations, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, process operation, process operations, element, or elements and vice versa, such as the terms "comprising," "consisting essentially of," "consisting of" also include the product of the combinations of elements listed after the term.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. For example, the recitation of the numerical range 1 to 5 includes the subranges 1 to 4, 1.5 to 4.5, 1 to 2, among other subranges. As another example, the recitation of the numerical ranges 1 to 5, such as 2 to 4, includes the subranges 1 to 4 and 2 to 5, among other subranges. Additionally, within a range includes every point or individual value between its end points even though not explicitly recited. For example, the recitation of the numerical range 1 to 5 includes the numbers 1, 1.5, 2, 2.75, 3, 3.80, 4, 5, among other numbers. Thus, every point or individual value may serve as its own lower or upper limit combined with any other point or individual value or any other lower or upper limit, to recite a range not explicitly recited.

References cited herein are incorporated by reference herein in their entirety to indicate the state of the art as of their publication or filing date and it is intended that this information can be employed herein, if needed, to exclude specific embodiments that are in the prior art.

As used herein, the indefinite article "a" or "an" shall mean "at least one" unless specified to the contrary or the context clearly indicates otherwise. For example, embodiments comprising "a housing" include embodiments comprising one, two, or more housings, unless specified to the contrary or the context clearly indicates only one housing is included.

While the foregoing is directed to embodiments of the present disclosure, other and further aspects of the disclosure may be devised without departing from the basic scope thereof, and the scope thereof is determined by the claims that follow.

What is claimed is:

1. An apparatus configured for characterizing a foam property under reservoir conditions, the apparatus comprising:

a housing containing an unconsolidated porous media;

a first pump in fluid communication with an upstream end of the housing via a first valve, the first pump configured to deliver a foaming composition to the housing;

a second pump in fluid communication with the upstream end of the housing via the first valve, the second pump configured to deliver a gas to the housing;

one or more temperature control devices configured to heat the foaming composition and the gas at a temperature of 35° C. to 115° C.;

a visualization chamber in fluid communication with a downstream end of the housing via a second valve, the visualization chamber configured to allow visualization of a foam produced in the housing; and a differential pressure transducer in fluid communication with the upstream end of the housing via the first valve, the differential pressure transducer in further fluid communication with the downstream end of the housing via the second valve, the differential pressure transducer configured to measure a pressure of a foam formed by interaction of the foaming composition and the gas in the presence of the unconsolidated porous media, the apparatus configured for characterizing a foam property of the foam in the presence of the unconsolidated porous media at a pressure of 500 psi to 6,000 psi.

2. The apparatus of claim 1, wherein the unconsolidated porous media is hydrophobic.

3. The apparatus of claim 1, wherein the unconsolidated porous media is hydrophilic.

4. The apparatus of claim 1, wherein the gas comprises a hydrocarbon gas, $CO_2$, $N_2$, or combinations thereof.

5. The apparatus of claim 1, wherein a hydrocarbon oil is disposed within the unconsolidated porous media packed inside the housing.

6. The apparatus of claim 1, comprising:

a plurality of housings, each housing containing unconsolidated porous media, wherein each housing of the plurality of housings is arranged in parallel fluid communication with the one or more pumps and the visualization chamber.

7. The apparatus of claim 1, wherein the apparatus is configured for characterizing a dynamic foam property of the foam.

8. The apparatus of claim 1, wherein the apparatus is configured for characterizing a bulk foam property of the foam.

9. The apparatus according to claim 1, wherein the apparatus is configured for characterizing a half-life of the foam, a pressure drop across the unconsolidated porous media due to foam formation, a dynamic apparent viscosity of the foam across the unconsolidated porous media, or combinations thereof.

10. The apparatus of claim 1, further comprising a third pump coupled to an upstream end of the housing by the first valve, the third pump configured to deliver a hydrocarbon oil to the upstream end of the housing.

11. The apparatus of claim 10, wherein the differential pressure transducer is further configured to directly measure the pressure of a foam formed by interaction of the foaming composition and the gas in the presence of the unconsolidated porous media and the hydrocarbon oil.

\* \* \* \* \*